(12) United States Patent  
Goldenberg et al.

(10) Patent No.: US 7,840,100 B2
(45) Date of Patent: Nov. 23, 2010

(54) DEVICES FOR DISPERSION COMPENSATION, BEAM DISPLACEMENT, AND OPTICAL SWITCHING

(75) Inventors: Efraim Goldenberg, Ashdod (IL); Yuval Gerson, Givataim (IL); Vyacheslav Aminov, Ramla (IL)

(73) Assignee: Civcom Devices & Systems Ltd., Petach Tiqwa (IL)

( * ) Notice: Subject to any disclaimer, the term of this patent is extended or adjusted under 35 U.S.C. 154(b) by 0 days.

(21) Appl. No.: 12/366,051

(22) Filed: Feb. 5, 2009

(65) Prior Publication Data

US 2009/0231705 A1 Sep. 17, 2009

Related U.S. Application Data

(63) Continuation of application No. PCT/IL2007/000984, filed on Aug. 7, 2007.

(60) Provisional application No. 60/835,913, filed on Aug. 7, 2006.

(51) Int. Cl.
*G02B 6/00* (2006.01)
*G02B 5/30* (2006.01)
*H01J 14/02* (2006.01)

(52) U.S. Cl. .................. 385/11; 398/159; 359/484

(58) Field of Classification Search ............... None
See application file for complete search history.

(56) References Cited

U.S. PATENT DOCUMENTS 5,872,878 A 2/1999 Bergmann

| 6,041,151 | A | 3/2000 | Mendlovic et al. |
| 6,396,629 | B1 | 5/2002 | Cao |
| 6,560,015 | B1 | 5/2003 | Cao |
| 6,636,651 | B2 | 10/2003 | Li |
| 6,804,467 | B2 * | 10/2004 | Colbourne et al. .......... 398/159 |
| 6,807,329 | B2 | 10/2004 | Zalevsky et al. |
| 7,072,111 | B2 | 7/2006 | Iwatsuka |
| 2003/0086168 | A1 * | 5/2003 | Copner et al. ............... 359/484 |
| 2005/0174639 | A1 | 8/2005 | Zalevsky et al. |

OTHER PUBLICATIONS

International Search Report, mailed Mar. 19, 2008, from International Application No. PCT/IL2007/000984, filed Aug. 7, 2007.

(Continued)

*Primary Examiner*—Tina M Wong
(74) *Attorney, Agent, or Firm*—Houston Eliseeva, LLP

(57) ABSTRACT

A method of laterally displacing at least a component of a light beam, the method comprising: a) directing the beam to enter a block of birefringent material at a first location, and at least the component of the beam to pass through the block on a first path to an exit location; and b) changing a polarization of the component of the beam after it has passed through the block, and directing it to pass back through the block from the previous exit location to a next exit location, following a next path oriented at changed angle due to its changed polarization state, at least one time; the component of the beam thereby being laterally displaced from the first location, when it exits the block a last time.

16 Claims, 9 Drawing Sheets

OTHER PUBLICATIONS

International Preliminary Report on Patentability, dated Mar. 17, 2009, from International Application No. PCT/IL2007/000984, filed Aug. 7, 2007.

"Gires-Tournois etalon," http://en.wikipedia.org/wiki/Gires-Tournois_etalon, downloaded Feb. 14, 2007.

"Dispersion Compensation" in the online Encyclopedia of Laser Physics and Technology, http://www.rp-photonics.com/dispersion_compensation.html, last updated Apr. 16, 2009.

* cited by examiner

DEVICES FOR DISPERSION COMPENSATION, BEAM DISPLACEMENT, AND OPTICAL SWITCHING

RELATED APPLICATIONS

This application is a Continuation of PCT application serial number PCT/IL2007/000984 filed on Aug. 7, 2007, which in turn claims the benefit under 35 USC 119(e) of U.S. Provisional Application No. 60/835,913, filed Aug. 7, 2006, both of which are incorporated herein by reference in their entirety.

FIELD OF THE INVENTION

The field of the invention is optical communication and processing.

BACKGROUND OF THE INVENTION

Light traveling in optical networks often suffers from chromatic dispersion, or polarization mode dispersion, which can lead to degradation of signals and unacceptably high error rates. In order for such networks to function, digital signals are converted into electrical signals, and back into fresh optical signals, at intervals short enough so that error rates are acceptably small. But such optical-electrical signal converters are expensive, and may dominate the cost of the network, and may slow it down. Methods of optically compensating for dispersion can help to reduce such costs, and/or increase speed, by allowing optical signals to propagate for greater distances before they become degraded.

Chromatic dispersion in optical networks, i.e. group delay which varies with frequency, is often compensated for by dispersion compensation fibers, as described, for example, in the article on "Dispersion Compensation" in the online *Encyclopedia of Laser Physics and Technology*, http://www.rp-photonics.com/dispersion_compensation.html, the disclosure of which is incorporated herein by reference. Such fibers generally produce dispersion compensation that is a fixed function of frequency, depending on the composition of the fiber, even if the requirements for dispersion compensation are changing in time, as occurs, for example, in reconfigurable optical networks. The dispersion compensation as a function of frequency generally provides a good match to the required dispersion compensation only over a limited bandwidth, because there are only a limited number of parameters, in the composition of the fiber, that can be used to adjust the dispersion as a function of frequency. This limits the bandwidth that can be used, and may limit the use of a given dispersion compensation fiber to only a single channel. Dispersion compensation fibers generally do not provide compensation for polarization mode dispersion. They may also be expensive and bulky, since a long length of fiber, as much as several kilometers, may be needed, and a given fiber can only compensate for a fixed degree of dispersion.

Gires-Tournois (GT) etalons are devices made of a transparent material with finite index of refraction n, with a fully reflecting back surface, and a partially reflecting front surface of reflectivity R, parallel to the back surface. Light entering the front surface reflects multiple times inside the etalon, and the interference of the beam components undergoing different numbers of reflections produces an output beam that has very little attenuation, but has a phase delay that is a nonlinear function of frequency, depending on the relationship of the wavelength of the light to the thickness d of the etalon. The GT etalon has a chromatic dispersion that is a periodic function of frequency, that depends on the index of refraction n, the thickness d, and the reflectivity R. An article at htpp://en.wikipedia.org/wiki/Gires-Tournois_etalon, downloaded on Feb. 14, 2007, the disclosure of which is incorporated by reference, provides more details of how GT etalons work, and describes some of their uses, for example in pulse compression, and in nonlinear Michelson interferometers.

SUMMARY OF THE INVENTION

An aspect of an embodiment of the invention concerns a dispersion compensation module in which a beam of light, after entering the dispersion compensation module, interacts with a dispersion compensating element, exits the element, and reflects back to the element, interacting with the element again.

Optionally the dispersion compensating element is a GT etalon, and the dispersion compensation produced by the module is greater than the dispersion compensation from a single interaction with a GT etalon, because the light interacts with it more than once. Optionally, the change in frequency over which the dispersion compensation repeats, due to the periodicity of the dispersion of the GT etalon as a function of frequency, is equal or nearly equal to the difference in frequency of adjacent channels used by an optical network in which the dispersion compensation module operates.

In some embodiments of the invention, the module comprises a block of a birefringent material, and the light beam, or at least a polarized component of it, passes through the block on a path from an input location on a first side of the block, to the dispersion compensating element on a second side of the block, opposite the first side. After interacting with the dispersion compensating element, the light travels back through the block, but with a changed polarization, for example rotated by 90 degrees, following a different path, oriented at a changed angle, to a directing element on the first side of the block, laterally displaced from the input location. The directing element, for example a mirror, or another GT etalon, directs the light back through the block to the second side, but with the polarization changed again, for example back to its value when the light crossed the block the first time, so the light again follows a different path, oriented at a changed angle, and the light returns to the dispersion compensating element laterally displaced from the location where the light previously interacted with the dispersion compensating element.

Optionally, the two sides of the block are substantially planar surfaces, and substantially parallel to each other. Optionally, the light propagates substantially perpendicular to the planar surfaces, just before it enters and just after it leaves the block, each time it passes across the block, even though the path inside the block is sometimes at an oblique angle to the surface, due to the birefringence.

Optionally, the polarization is changed by quarter wave plates, or equivalent elements, located on each side of the block, which the light passes through twice, each time it interacts with the dispersion compensating element or the directing element.

This process is optionally repeated a well-defined number of times, with the light bouncing back and forth between the two sides of the block, laterally displaced on each bounce, until it reaches an output port and leaves the dispersion compensation module. The number of bounces depends on the location of the output port, and on the difference in angle of orientation of the path in the birefringent material, for the different polarization states of the light.

In some embodiments of the invention, the dispersion compensation characteristics of the module are controlled in real time. For example, the dispersion compensation characteristics of the dispersion compensating element are controlled in real time, for example by controlling the temperature of the element. Alternatively or additionally, means are used to control the number of times the light interacts with the element, in real time. Optionally, feedback is used to optimize the dispersion compensation characteristics of the module in real time, for example by minimizing the bit error rate in an optical network, or by minimizing a more direct measure of dispersion.

In some embodiments of the invention, an input light beam, optionally unpolarized, is split into two polarization components before it enters the dispersion compensation module, and each polarization component, when it enters the module, interacts with a different dispersion compensation element, with different characteristics, thereby compensating for polarization mode dispersion in the input beam.

In some embodiments of the invention, the dispersion compensation module comprises a plurality of dispersion compensation elements, optionally with different characteristics, providing additional degrees of freedom in the dispersion compensation as a function of frequency.

An aspect of some embodiments of the invention comprises a device for lateral displacement of a light beam, or at least a polarized component of it, using a block of birefringent material with two sides, optionally substantially parallel planar surfaces. The light beam enters the block at a first location on the first side, and at least the component of the light beam crosses the block on a first path, to a first exit location on the second side. The light exits the block, and is directed back to the block by a directing element, such as a mirror, re-entering the block, optionally at the first exit location, but with changed polarization, for example rotated by 90 degrees. The polarization is changed by a polarization changing element, for example, by passing twice through a quarter wave plate, or equivalent element, between the second side of the block and the directing element. The light then crosses the block back to the first side, but following a different path, with a changed angle of orientation, due to the changed polarization, and reaches a second exit location on the first side, laterally displaced from the first location where the light entered the block on the first side.

Optionally, there is another directing element, such as a mirror, and optionally there is another polarization changing element, on the first side, and the light is again directed back to the block with its polarization changed, for example back to the polarization it had the first time it crossed the block. The process optionally repeats, with the light bouncing back and forth across the block, and becoming laterally displaced each time, until it exits the block for a last time, at an exit port.

Optionally, the light propagates substantially perpendicular to the planar surfaces, just before it enters and just after it leaves the block, each time it passes across the block, even though the path inside the block is sometimes at an oblique angle to the surface, due to the birefringence.

The device may displace the light by any of a plurality of different closely spaced distances, depending on the location of the exit port. Optionally, the direction of displacement of the light depends on its polarization when it enters the device. Optionally the light leaves through one of two exit ports, depending on its polarization when it enters the device. Optionally, there are a plurality of output ports, and one or both of the mirrors are movable, so that the choice of output port, and the displacement distance, is controllable in real time.

There is thus provided, in accordance with an exemplary embodiment of the invention, a method of laterally displacing at least a component of a light beam, the method comprising:
a) directing the beam to enter a block of birefringent material at a first location, and at least the component of the beam to pass through the block on a first path to an exit location; and
b) changing a polarization of the component of the beam after it has passed through the block, and directing it to pass back through the block from the previous exit location to a next exit location, following a next path oriented at changed angle due to its changed polarization state, at least one time;

the component of the beam thereby being laterally displaced from the first location, when it exits the block a last time.

Optionally, directing the beam to enter the block comprises directing the beam to propagate substantially perpendicular to a surface of the block just before entering the block.

Optionally, directing the beam component to pass back through the block comprises directing the beam component to propagate substantially perpendicular to a first surface of the block just before entering the block, and to propagate substantially perpendicular to a second surface of the block which is substantially parallel to the first surface, just after passing through the block.

Optionally, directing the beam component to pass back through the block comprises directing the beam component back to substantially a same location where the beam component last exited from the block.

In an embodiment of the invention, the method comprises:
a) directing another component of the beam with different polarization to pass through the block on a second component path to a second component exit location; and
b) changing a polarization of the second component of the beam after it has passed through the block, and passing it back through the block from the previous second component exit location to a next second component exit location, following a next second component path oriented at changed angle due to its changed polarization state, at least one time;

the second component of the beam thereby being laterally displaced from the first location when it exits the block a last time, in a direction opposite to the displacement of the first beam component.

There is further provided, according to an exemplary embodiment of the invention, a method of changing the dispersion of a light beam, the method comprising:
a) causing the light beam to enter and interact with a dispersion compensating element, and to leave the dispersion compensating element;
b) directing the light beam back to the dispersion compensating element and repeating (a) at least one time;

thereby causing the dispersion of the light beam to change more than if it only interacted once with the dispersion compensating element.

Optionally, the method includes directing the light beam to enter a block of birefringent material at a first entry location and to pass through the block on a first path to a first exit location, before causing the light beam to enter the dispersion compensating element the first time.

Optionally, the method includes directing the light beam to pass back through the block, in a changed polarization state, from the first exit location, following another path oriented at a changed angle due to its changed polarization state, to a location on the same side of the block as the first entry location, but laterally displaced.

In an embodiment of the invention, directing the light beam back to the dispersion compensating element each of the at least one times comprises:

a) changing a polarization state of the light beam;
b) directing the light beam to pass back through the block from the previous exit location to an opposite location, following another path oriented at a changed angle due to its changed polarization state;
c) changing the light beam substantially back to its previous polarization state; and
d) directing the light beam to pass back through the block from said opposite location to a next exit location, following still another path oriented at a changed angle due to its changed polarization state;

the light entering a different portion of the dispersion compensating element, laterally displaced from said previous exit location.

There is further provided, according to an exemplary embodiment of the invention, a device for laterally displacing a beam, comprising:

a) a block of birefringent material with a first side and a second side;
b) an input port which directs the light beam to enter the block at a first location on the first side;
c) a first reflecting element which reflects the beam from a first exit location on the second side back to the first exit location to re-enter the block; and
d) a first polarization changing element which changes the polarization of the light before it re-enters the block at the first exit location;

wherein the device is configured so that when the beam enters the block from the input port, at least a component of the beam passes through the block to the first exit location, and the beam that re-enters the block at the first exit location follows a path oriented at a changed angle, due to its changed polarization, passing back through the block to the first side, reaching a second exit location displaced laterally from the first location.

Optionally, the device also includes:

a) a second reflecting element which reflects the beam from the second exit location back to the second exit location, so that it re-enters the block and passes back through the block to the second side; and
b) a second polarization changing element which changes the polarization of the light before it re-enters the block at the second exit location, so that it follows a path oriented at a changed angle when it passes back through the block to the second side, reaching a third exit location laterally displaced from the first exit location.

Optionally, the first and second reflecting elements, and the first and second polarization changing elements, each extend laterally far enough along the block on their respective sides, so that the light passes back and forth through the block between successive exit locations on the first and second sides a plurality of times, being further laterally displaced each time.

There is further provided, according to an exemplary embodiment of the invention, a dispersion compensation device comprising:

a) an input module which receives a light beam;
b) a dispersion compensating module to which the input module directs light from the light beam, comprising:
i) a dispersion compensating element which changes dispersion of the light when the light interacts with it; and
ii) a directing element which directs the light back to interact with the dispersion compensating element at least one additional time, after leaving the dispersion compensating element.

Optionally, the dispersion compensating module comprises:

a) a block of birefringent material through which the light passes between the dispersion compensating element, situated on a first side of the block, and the directing element, situated on a second side of the block; and
b) a polarization changing element situated between the second side of the block and the directing element, which changes the polarization of the light directed back to the dispersion compensating element, causing the light to follow a changed path in the birefringent block, and to return to the dispersion compensating element at a location laterally displaced along the first side from a location where the light previously left the dispersion compensating element.

Optionally, the input module directs the light to the dispersion compensating element through the block of birefringent material from the second side to the first side, and the dispersion compensating module comprises a second polarization changing element situated between the first side of the block and the dispersion compensating element, which polarization changing element changes the polarization of the light interacting with the dispersion compensating element, so that after interacting the light follows a different path in the block, reaching the directing element instead of returning to the input module.

Optionally, the directing element comprises a mirror.

Optionally, the dispersion compensating element comprises at least one GT etalon.

Optionally, the directing element comprises a second dispersion compensating element.

Optionally, the second dispersion compensating element comprises at least one GT etalon.

Optionally, the at least one GT etalon comprises at least a first and a second GT etalon, with different characteristics, arranged so that the light interacts with the second GT etalon after interacting with the first GT etalon.

Optionally, the device comprises a control module which controls the degree of dispersion compensation, by controlling the temperature of at least one of the at least one GT etalons.

Optionally, the device comprises a heater, and a thermoelectric cooler, to control said temperature.

In an embodiment of the invention, the device includes a control module which controls at least two parameters of the dispersion compensating module.

Optionally, the first dispersion compensating module comprises at least two GT etalons, and the two parameters comprise dispersion characteristics respectively of the two GT etalons.

There is further provided, according to an exemplary embodiment of the invention, a multi-channel optical network with a substantially constant channel spacing, the network comprising a dispersion compensation device according to an embodiment of the invention, wherein a free spectral range of the at least one GT etalons is substantially equal to the channel spacing.

Optionally, the polarization changing element comprises a quarter wave plate equivalent through which the light passes on the way to the directing element, and through which the light passes again on the way back to the block from the directing element.

Optionally, the input module comprises a polarizing beam splitter.

Optionally, the input module is configured to convert an unpolarized light beam entering it into two parallel polarized light beams which enter the dispersion compensation module.

Optionally, the device includes an output beam directing element which directs the two parallel polarized light beams leaving the dispersion compensating module back through the input module, such that the polarizing beam splitter combines them into an unpolarized output light beam.

Optionally, the device includes an output module, configured to receive the two parallel polarized light beams leaving the dispersion compensating module, and to combine them into an unpolarized output beam.

Optionally, the dispersion compensating module is configured to change the dispersion of each of the two parallel light beams by a different amount, thereby providing polarization mode dispersion compensation to the output beam.

In an embodiment of the invention, the dispersion compensating module is configured to change the group delay of each of the two parallel light beams by a different amount, thereby providing polarization mode dispersion compensation to the output beam.

There is further provided, according to an exemplary embodiment of the invention, an optical network comprising a dispersion compensation device according to an embodiment of the invention, wherein at least one parameter of the dispersion compensating module is chosen to maximize one or more of Q-factor and eye-opening, or minimize bit error rate of the network, or both.

Optionally, the device includes a control module to control the degree of dispersion compensation provided by the dispersion compensating module, in real time.

In an embodiment of the invention, the dispersion compensation module comprises a movable mirror which covers the dispersion compensating element to an adjustable extent, the covering portion blocking the light from interacting with the dispersion compensating element, thereby controlling the degree of dispersion compensation.

Optionally, the device includes a control module which controls the movable mirror in real time.

There is further provided, according to an exemplary embodiment of the invention, an optical network comprising a dispersion compensation device according to an embodiment of the invention, wherein the control module is configured to use a feedback loop to control one or more of Q-factor, eye-opening, and bit error rate in the network, by controlling the degree of dispersion compensation provided by the dispersion compensation device.

There is further provided, according to an exemplary embodiment of the invention, an optical network comprising a dispersion compensation device according to an embodiment of the invention, wherein the control module monitors the wavelength of light in the network, and controls the degree of dispersion compensation depending on the wavelength.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

In describing the drawings, language will sometimes be used to the effect that a light beam undergoes a first event, for example an interaction with or passage through an optical element, followed in time by a second event. It should be understood that such language means that the second event would follow the first event from the point of view of an observer traveling along the light beam in the direction that the light is propagating. But at any given time, both of the events may be taking place simultaneously, to different parts of the beam.

Figure 1:
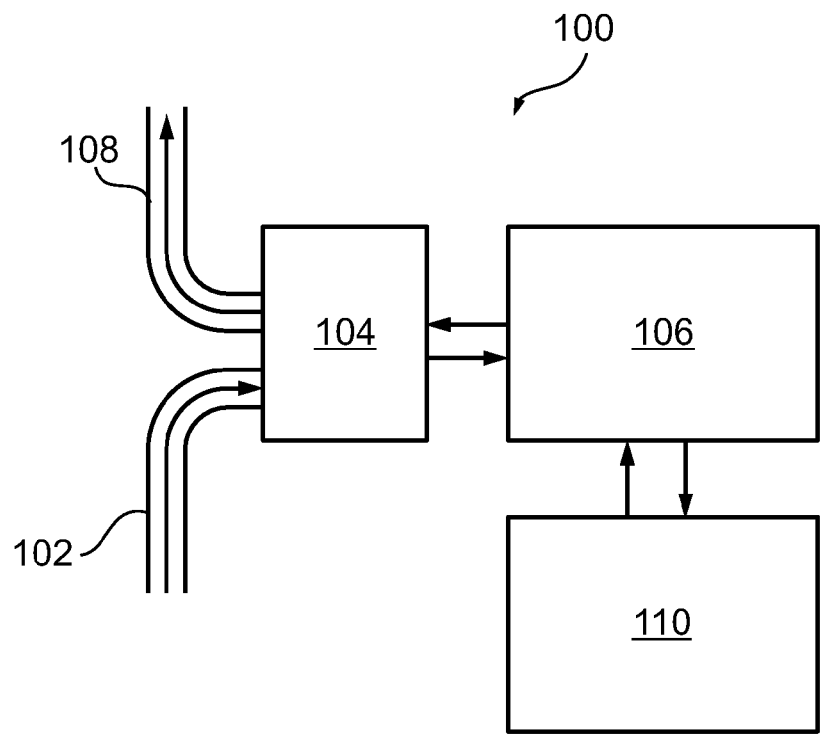
FIG. 1 schematically shows a dispersion compensation device, comprising an input/output module and a dispersion compensation module, used in an optical network, according to an exemplary embodiment of the invention.

FIG. 1 schematically shows a dispersion compensation device 100, used for dispersion compensation in an optical network, according to an exemplary embodiment of the invention. We will first describe the overall architecture of the device, and then, starting with FIG. 5, describe how the dispersion compensation works.

Device 100 may be incorporated into an existing transceiver or transponder used in an optical network, or it may be used as a stand-alone device, optionally in series with other plug-in modules in an optical network, for example an amplifier to compensate for beam attenuation An input light beam, propagating for example in an optical fiber 102, enters an input/output module 104. Light from the input light beam, optionally split into polarized beams by input/output module 104 as will be described below in FIG. 4, then enters a dispersion compensating module 106, which compensates for dispersion in the light, and returns the light to input/output module 104. Input/output module 104 then optionally processes the dispersion compensated light, for example recombining two polarized beams into a single unpolarized output light beam, as will be described below. The dispersion compensated output light beam then leaves dispersion compensation device 100, for example through optical fiber 108, or through a circulator which sends the output beam to its next destination. An optional control module 110 controls the dispersion compensation, as a function of frequency and/or polarization mode, by adjusting control parameters of dispersion compensating module 106, such as temperature, as will be described below in connection with FIGS. 5 and 8. Optionally, this is done in real time, in response to feedback received by control module 110, possibly including direct measurements of the dispersion of the light beam, and/or measurements of signal quality in the optical network, such as bit error rate. Optionally, control module 110 also monitors the wavelength of light passing through device 100, and adjusts control parameters of dispersion compensating module 106 according to the wavelength of the light. Optionally, device 100 includes an amplifier to compensate for beam attenuation.

Figure 2:
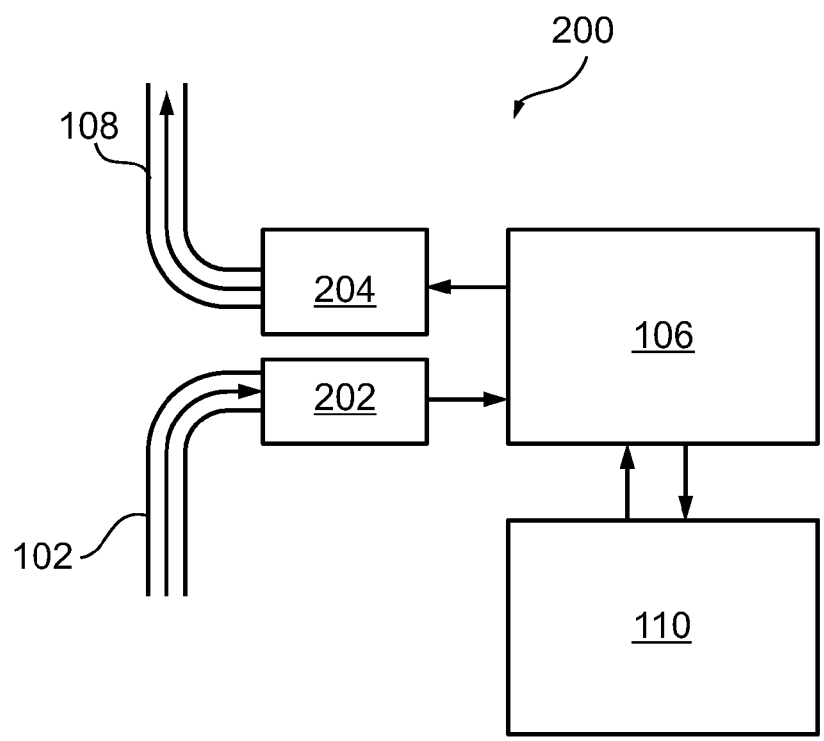
FIG. 2 schematically shows an alternative configuration of a dispersion compensation device used in an optical network, comprising separate input and output modules, according to an exemplary embodiment of the invention.

FIG. 2 schematically shows a design for an alternative dispersion compensation device 200, according to another exemplary embodiment of the invention. Device 200 is similar to device 100, but has a separate input module 202 and output module 204, instead of combined input/output module 104. While device 100 may be more compact than device 200, and only uses a single polarizing beam splitter, the parts in device 200 may be easier to assemble and align.

Figure 3:
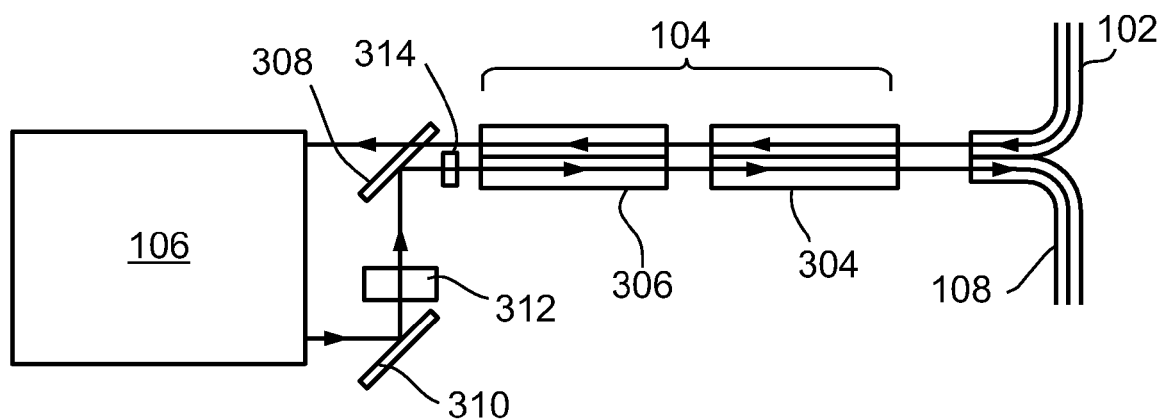
FIG. 3 schematically shows further details of the input/output module shown in FIG. 1, comprising a polarizing beam splitter.
Figure 4:
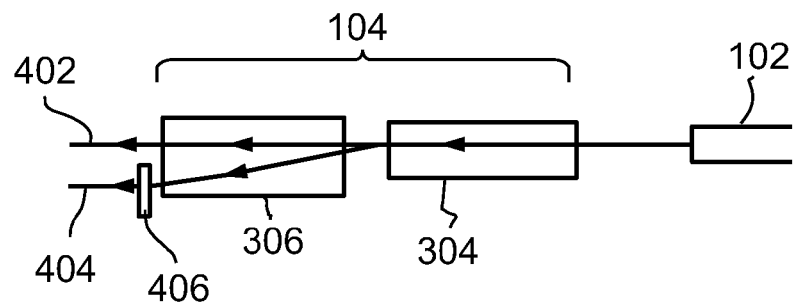
FIG. 4 schematically shows a side view of the polarizing beam splitter of FIG. 3.

FIG. 3 schematically shows input/output module 104 in more detail, according to an exemplary embodiment of the invention. An input light beam, optionally unpolarized, from optical fiber 102 enters collimator 304, which comprises, for example, a ferrule and gradient-index lens. The light beam then enters an optional polarizing beam splitter 306. The operation of polarizing beam splitter 306 is shown in FIG. 4, which is a side view of input/output module 104, in the plane containing the input light beam. FIG. 4 will be described now, before returning to FIG. 3.

Beam splitter 306 splits the input light beam into two parallel linearly polarized beams 402 and 404. In the embodiment of the invention shown in FIG. 4, beam splitter 306 comprises a birefringent material such as calcite, YVO$_4$, or any other birefringent crystal. Alternatively, another type of polarizing beam splitter, such as a thin film beam splitter, is used instead. Optionally, a half-wave plate 406 rotates the polarization of one of the beams, beam 404 in the example shown in FIG. 4, by 90 degrees, so that the two beams emerge with the same linear polarization. In FIG. 3, as well as in FIGS. 5, 7, and 8, the two parallel beams would be displaced from each other in a direction perpendicular to the plane of the drawing, so only one of the two parallel beams would be visible in the drawing, but it should be understood that both beams may be present. For simplicity, in describing FIGS. 3, 5, 7, and 8, the pair of parallel beams will sometimes be referred to as "the beam."

In some embodiments of the invention, the input beam from optical fiber 102 is polarized to begin with, and there is no polarizing beam splitter. In other embodiments of the invention, the input beam is unpolarized, there is no separate polarizing beam splitter, and dispersion compensating module 106 only allows one polarization component of the input beam to pass through. However, it is potentially advantageous to have polarized beams entering dispersion compensating module 106, so that all of the beam will pass through it.

Returning to the description of FIG. 3, there is an optional thin-film polarizing beam splitter 308 located in the path of the light beam (which may actually be a pair of parallel beams, as noted above) after it emerges from polarizing beam splitter 306. If thin-film beam splitter 308 is in the path of the light beam emerging from polarizing beam splitter 306, then the light beam is polarized so that it passes through thin-film beam splitter 308. The beam then enters dispersion compensating module 106, and emerges from module 106 as an output beam (or a pair of parallel beams), with its dispersion changed, and displaced from the location where it entered. The output beam is reflected from a mirror 310, and optionally through a half-wave plate 312, rotating its direction of polarization by 90 degrees. The output beam now has a different polarization from the input beam, and therefore is reflected by thin-film beam splitter 308, instead of passing through it, and is directed back toward polarizing beam splitter 306. Optionally, another half-wave plate 314 rotates the polarization of the output beam back to its original direction, before the output beam reaches polarizing beam splitter 306. Half-wave plate 314 is optionally located in the path of the input beam, between polarizing beam splitter 306 and thin-film beam splitter 308, instead of in the path of the output beam, and the input beam, when it emerges from polarizing beam splitter 306, is polarized so that it would be reflected from thin-film beam splitter 308. Whether or not that is true, half-wave plate 312 is optionally located in the path of the input beam, between thin-film beam splitter 308 and module 106, or in the path of the output beam between module 106 and mirror 310.

It should be noted that, instead of using thin-film beam splitter 308, a mirror may be used to reflect output beam back toward polarizing beam splitter 306. In this case, the mirror is positioned out of the path of the input beam, so that the input beam is not deflected on its way from polarizing beam splitter 306 to dispersion compensating module 106.

In some embodiments of the invention, the direction of the light beam shown in FIG. 3, or in any of the alternative configurations described above, is reversed, with the input beam being reflected by thin-film beam splitter 308 and mirror 310, and entering dispersion compensating module 106 near the bottom, while the output beam emerges from module 106 near the top, and passes through thin-film beam splitter 308 before re-entering polarizing beam splitter 306.

When the output beam reaches polarizing beam splitter 306, one of the two parallel beams optionally passes back through half-wave plate 406, or another half-wave plate, so that the two parallel beams again have two different linear polarizations, oriented 90 degrees apart. Polarizing beam splitter 306 then combines the two beams back into a single unpolarized beam, assuming that the input beam was originally unpolarized when it entered polarizing beam splitter 306. The unpolarized output beam then passes back through collimator 304, and is directed to optical fiber 108.

In dispersion compensation device 200, there are no reflectors 308 and 310, or half-wave plates 312 and 314. Instead, the output beam emerging from dispersion compensating module 106 goes directly to another polarizing beam splitter and collimator which comprise output module 204, similar to polarizing beam splitter 306 and 304 which comprise input module 202, and the output beam then passes to optical fiber 108.

Figure 5:
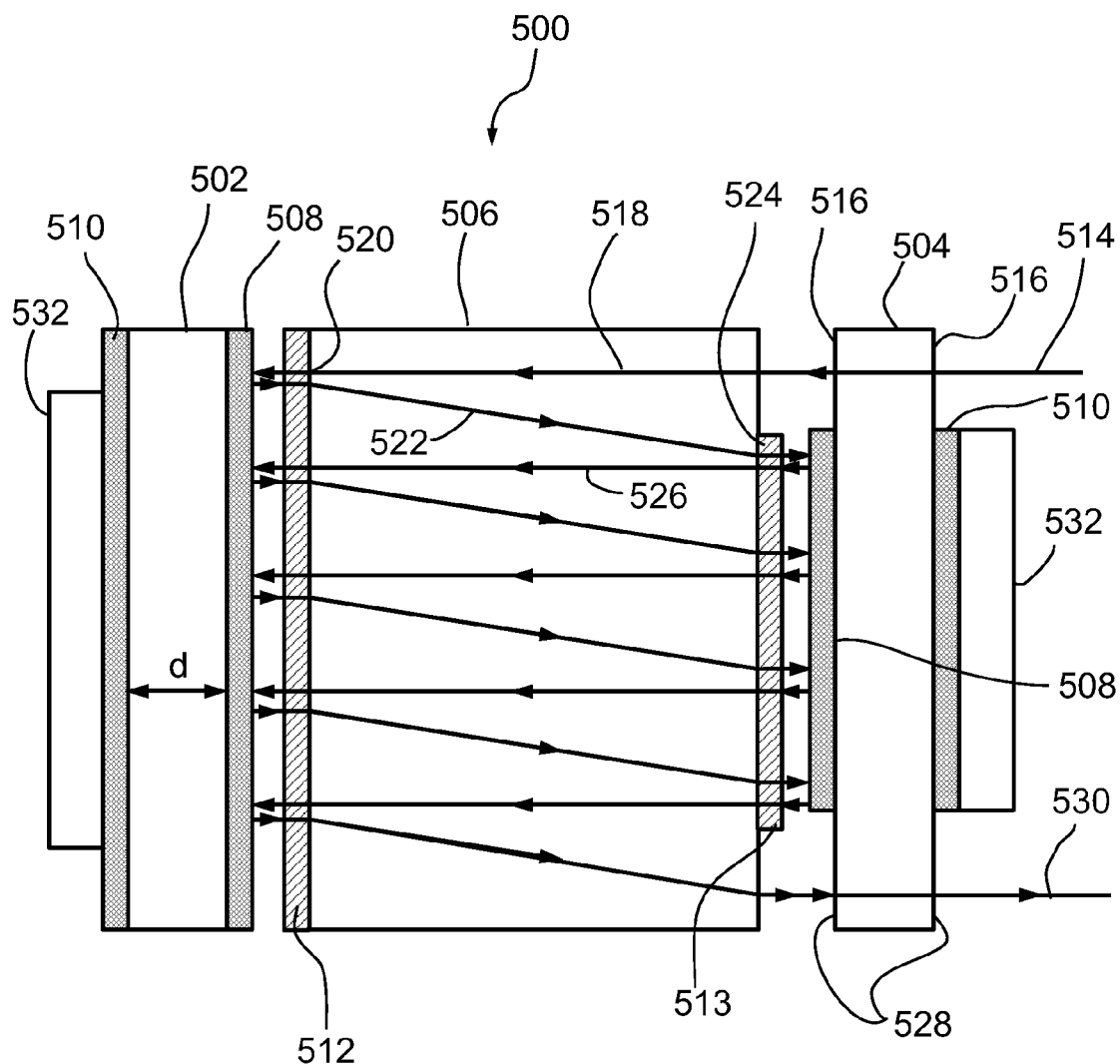
FIG. 5 schematically shows the dispersion compensation module of FIG. 1 or FIG. 2.

FIG. 5 schematically shows the structure and operation of a dispersion compensating module 500, which could be used for module 106 in FIGS. 1, 2, and 3, according to an exemplary embodiment of the invention. Module 500 comprises two dispersion compensating elements 502 and 504, shown as GT etalons in FIG. 5. As will be explained, module 500 is designed to cause the light beam to interact with the GT etalons a plurality of times, increasing the amount of dispersion compensation, and, in some embodiments of the invention, to be described below, control module 110, shown in FIGS. 1 and 2, can change the number of times that the light beam interacts with the GT etalons. In general, GT etalons 502 and 504 need not have the same optical characteristics, and it may be advantageous for them to have different characteristics to provide more degrees of freedom for dispersion compensation, as will be explained below.

Between the two etalons is a block of birefringent material 506, with quarter wave plates 512 and 513 respectively located between block 516 and GT etalons 502 and 504. The GT etalons each have a highly reflecting surface 510 on the back, with reflectivity greater than 0.98 or greater than 0.995, for example, and a partially reflecting surface 508 on the front with reflectivity R. For example, R is less than 0.01, or between 0.01 and 0.05, or between 0.05 and 0.2, or between 0.2 and 0.9, or greater than 0.9. Such reflectances are obtained, for example, by coating the surfaces with appropriate thin layers. Both surfaces are optically flat and parallel to each other, separated by a distance d, with a transparent material in between, with an index of refraction n. The reflecting surfaces of each etalon are also parallel to the surface of block 506 that they face, and to the opposite surface of the block and the reflecting surfaces of the other etalon on the other side of the block. Etalon 504, however, has reflecting surfaces 508 and 510 missing from regions 516 and 528, at its two ends, with only the transparent material present there. Quarter-wave plate 513 also does not extend to the ends of block 506. Input beam 514 passes through region 516 of etalon 504, and then passes through birefringent block 506, missing quarter-wave plate 513. The polarization of input beam 514 is initially linear, and in a direction such that the beam follows a path 518, straight through birefringent block 506, normal to the surface of block 506.

The input beam then passes through a quarter-wave plate 512, becoming circularly polarized, interacts with etalon 502, and passes back through quarter-wave plate 512, becoming linearly polarized again but in a different direction. Although, for clarity, the light beam leaving etalon 502 is shown slightly displaced from the light beam entering etalon 502, and similarly for etalon 504, the light beam may enter and leave the etalon at the same location. When the light beam passes back through quarter-wave plate 512 the second time, its polarization will be rotated 90 degrees from the direction it had when traveling on path 518. The birefringent nature of the block 506 will thus cause the light to travel at a small angle to path 518, on a path 522, instead of retracing path 518. Path 522 reaches the other side of block 506 at a location 524, where quarter-wave plate 513 and the reflecting layers of etalon 504 are present.

The light beam then passes through quarter-wave plate 513, interacts with GT etalon 504, and passes back through quarter-wave plate 513. The two passes through quarter-wave plate 513 brings the polarization of the light beam back to the direction it had initially, when it followed path 518. The light then follows a path 526, parallel to path 518. The process repeats a plurality of times, as the light bounces back and forth between the two etalons, interacting with each one, and being displaced laterally in position, shown as a vertical displacement in FIG. 5, each time it bounces back and forth. Finally, the light reaches region 528 of etalon 504, beyond the end of quarter-wave plate 513, and passes straight through region 528, forming output beam 530.

It should be understood that, in module 500, and in any of the devices described below which use quarter wave plates, one or more of the quarter wave plates may be replaced by any other optical element which causes linearly polarized light to rotate its direction of polarization by 90 degrees, if the light passes through the element twice. A general element satisfying this condition will be referred to herein as a "quarter wave plate equivalent." For example, a Faraday rotator element can be used which rotates the direction of polarization of linearly polarized light passing through it by 45 degrees. Even when it is not explicitly stated that such a "quarter wave plate equivalent" can be used, it should be understood that it can be used instead of a quarter wave plate, wherever a quarter wave plate is mentioned.

In some embodiments of the invention, light beam 514 has a different linear polarization direction, such that paths 518 and 526 are at an oblique angle to the surface of block 506, rather than being normal to it, and path 522 is normal to the surface of block 506. In those embodiments of the invention, block 506 is oriented differently, if input light beam 514 still enters block 506 at the upper right, so that the obliquely propagating light beams go down and to the left, instead of down and to the right as they do in FIG. 5. The result will be the same as described above, with the beam exiting the dispersion compensating module through region 528.

It should be noted that, as long as the beam is displaced laterally by much more than its own Gaussian width from one interaction with one of the etalons, and the next interaction with the same etalon, then the different interactions will not interfere appreciably with each other, and the group delay in the beam, from each interaction with the etalon, can be calculated separately, using Eq. (3) below, without considering the other interactions.

Optionally, this criterion is used to determine the maximum number of times that the beam can interact with each etalon. The Gaussian width of the beam increases as the beam propagates back and forth across the block, for example at a spreading angle of $\lambda/2a$, where $\lambda$ is the wavelength of the light, and a is the initial radius of the beam, for example at the input port to the dispersion compensating module. The width of the block is equal to the lateral displacement of the beam on each bounce, divided by the change in angle of propagation $\Delta\theta$ due to the birefringence of the block. And the distance of propagation of the beam is twice the width of the block, for each bounce. If we require the beam to be displaced laterally by at least 4a between bounces, then we find that the beam will double in width after $(\Delta\theta)a/2\lambda$ bounces. For example, if $a=0.5$ mm, $\Delta\theta=0.05$ radians, and $\lambda=1000$ nm, then the beam can make 12 bounces before its width doubles. Beyond that number of bounces, portions of the beam from successive bounces may substantially overlap in the etalon, and may significantly interfere with each other. Such overlap can be avoided if the block is about $4a/\Delta\theta=40$ mm wide, and about $2(\Delta\theta)a^2/\lambda=25$ mm long.

One might contemplate replacing block 506 in module 500 by empty space, and directing input beam 514 into this space at an angle slightly oblique to the horizontal, so that the beam continues to travel slightly downward as it bounces back and forth between etalons 502 and 504. However, using birefringent block 506, and directing input beam 514 so that it enters block 506 perpendicular to its surface, has the potential advantage that the light will enter the etalons perpendicular to their reflecting surfaces, which allows the etalons to function as designed, with their full group delay as a function of frequency. The light will also exit block 506 perpendicular to its surface, which may make it easier to direct the light into an optical fiber, or another optical element, than if the light were to exit device 500 at an oblique and possibly variable angle. The interface between an optical fiber carrying the input beam, and block 506, may also be simpler to design and more reliable, if the light enters block 506 perpendicular to its surface, rather than entering device 500 at an oblique angle.

The index of refraction n of one or both of the GT etalons may be changed by changing its temperature. The distance d may also change, due to thermal expansion. Due to both of these effects, changing the temperature of GT etalons 502 and/or 504 may be used to control the dispersion, as function of frequency, that they produce in the light beam each time it interacts with them. In some embodiments of the invention, GT etalons 502 and/or 504 are heated and/or cooled by thermoelectric devices 532, or by any other means of heating and/or cooling known to the art, in order to control the dispersion compensation. Optionally, this may be done in real time, as will be described in FIG. 11. Thermoelectric devices 532 are schematically shown located on the outer edges of GT etalons 502 and 504, in the plane of the drawing in FIG. 5, but the thermoelectric devices may be located differently, for example above or below the plane of drawing.

Figure 6A:
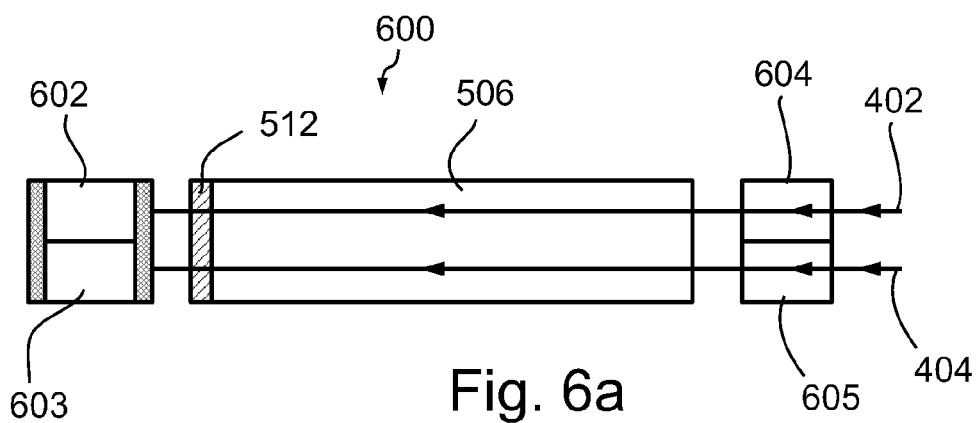
FIG. 6A schematically shows a side view of a dispersion compensation module for both chromatic and polarization mode dispersion, according to an exemplary embodiment of the invention.

FIG. 6A schematically shows a side view of a dispersion compensating module 600, similar to module 500 in FIG. 5, with a capability of compensating for polarization mode dispersion, using two sets of GT etalons in parallel, one set of etalons for each polarization component of an input beam. Module 600, or any of the other dispersion compensating modules described below, may be used for module 106 in FIGS. 1 and 2, instead of module 500. Parallel light beams 402 and 404 enter dispersion compensating module 600 at the right. These are the two beams which emerged from input module 104 in FIG. 4, and they represent the two polarization modes of the original unpolarized input beam from optical fiber 102 in FIG. 4, although they have the same linear polarization when they enter dispersion compensating module 600, because beam 404 has passed through half-wave plate 406, as shown in FIG. 4. Instead of single GT etalons 502 and 504 on the two sides of the dispersion compensating module, as in FIG. 5, dispersion compensating module 600 has two GT etalons stacked up on each side, GT etalons 602 and 603 on one side, and GT etalons 604 and 605 on the other side. Beam 402 goes through GT etalons 602 and 604, bouncing back and forth a plurality of times, like light beam 514 in FIG. 5, before leaving dispersion compensating module 600. Similarly, beam 404 goes through GT etalons 603 and 605 a plurality of times, bouncing back in forth, parallel to beam 402. By using GT etalons 603 and 605 with different properties than GT etalons 602 and 604, beams 402 and 404 can be given different amounts of dispersion compensation by dispersion compensating module 600. Optionally, the characteristics of the different GT etalons are controlled independently of each other, for example by controlling their temperatures independently, with separate thermoelectric devices, or by other means. When the two parallel beams go back through input/output module 104, or go through output module 204, and recombine to form an unpolarized output beam in optical fiber 108, the output beam will have its polarization mode dispersion compensated.

It should be understood that the dispersion compensating modules shown below in FIGS. 7 and 8 may also use separate GT etalons for the two parallel beams, representing the two polarization modes of the input beam, even though this is not explicitly shown in FIGS. 7 and 8.

Figure 6B:
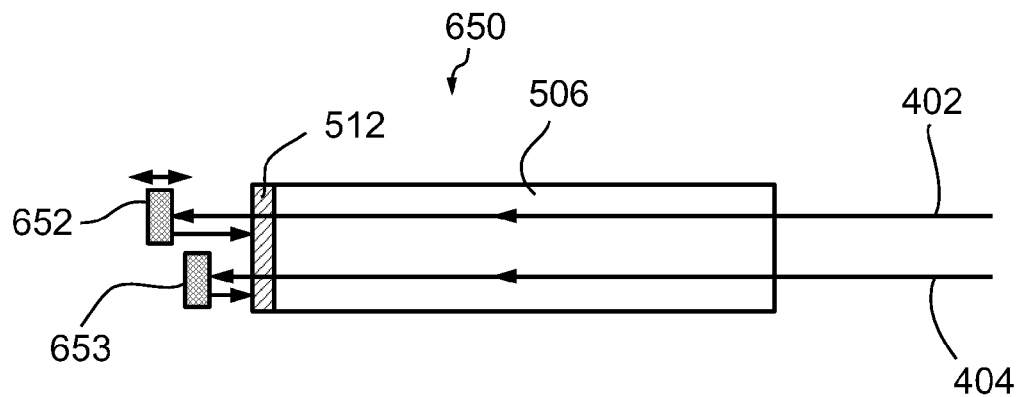
FIG. 6B schematically shows a side view, and FIG. 6C schematically shows a top view, of a dispersion compensation module for polarization mode dispersion, according to an exemplary embodiment of the invention.
Figure 6C:
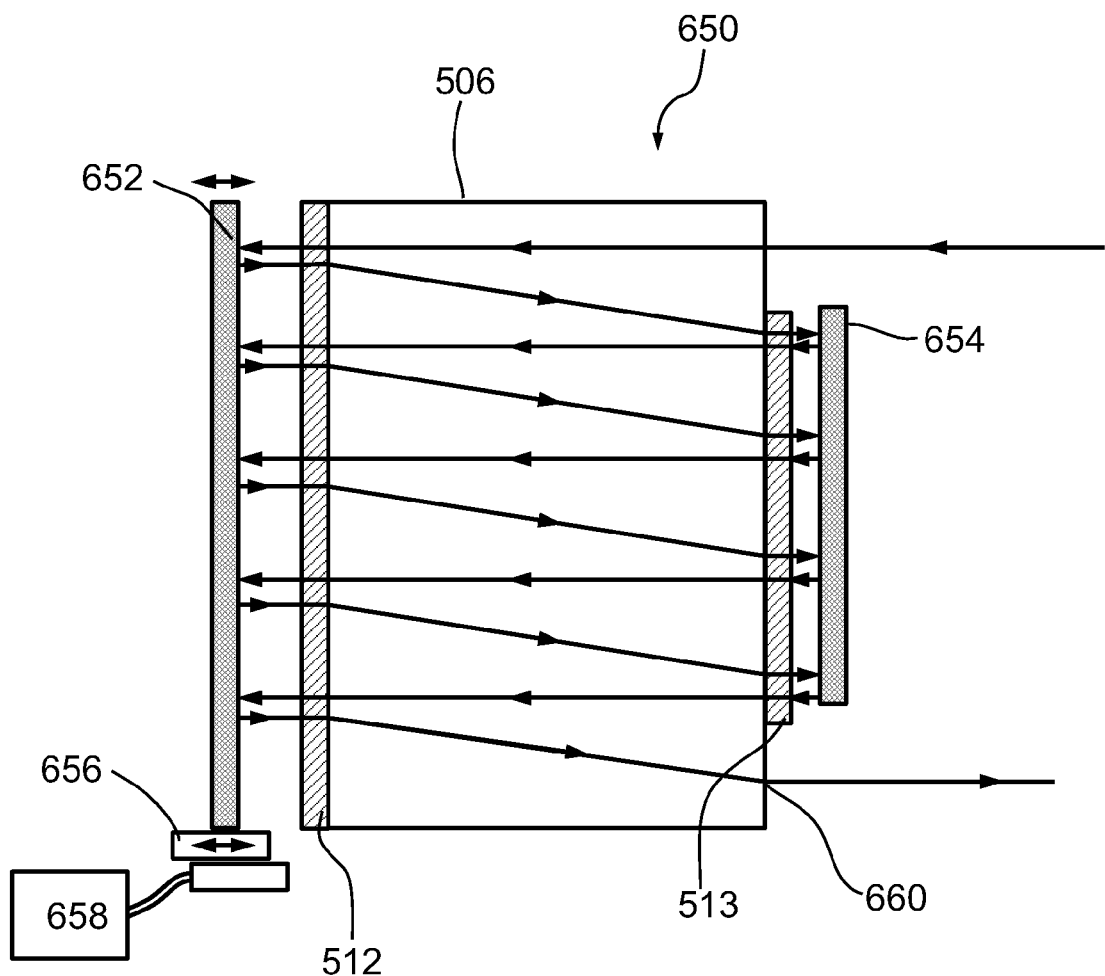

FIG. 6B schematically shows a side view, and FIG. 6C shows a top view, of a dispersion compensating module 650 that compensates for polarization mode dispersion, independent of frequency, rather than chromatic dispersion. Module 650 is similar to module 600, but with a set of two mirrors 652 and 653, in general located at different distances from birefringent block 506, instead of etalons 602 and 603, because there is no need for the group delay to depend on frequency, only on polarization. Split input beams 402 and 404 enter module 650 from the right, each beam coming from a different polarization mode of an original unpolarized input beam, as shown in FIG. 4, and pass through a birefringent block 506. Beam 402 reflects from mirror 652, and beam 404, propagating parallel to beam 402 in a plane below beam 402, reflects from mirror 653. There is also a mirror 654 on the other side of module 650, which reflects both beams. Mirror 654 is shown in FIG. 6C, the top view, but not in FIG. 6B because it does not extend to the plane of the drawing in FIG. 6B, which is the plane containing split beams 402 and 404 when the enter module 650. In some embodiments of the invention, mirror 654 is split into two mirrors, one for each of beams 402 and 404, in which case mirrors 652 and 653 are optionally replaced by a single mirror.

At least one of the mirrors, for example mirror 652 in the case illustrated in FIG. 6B, is moveable. The mirror is moved by a motor 656, which is optionally any kind of motor or actuator known to the art which is small enough to fit in the available space, and has high enough precision. Optionally, the motor does not dissipate too much heat or produce too much vibration. Suitable motors might include small conventional stepper motors, electrostatic motors, piezoelectric actuators, and piezoelectric peristaltic motors. Optionally, motor 656 is controlled by a control module 110, either directly, or through a local controller 658, which may, for example, increase the precision of motor 656 by sensing the position of the mirror and using feedback. Optionally, control module 110 uses direct or indirect measurements of polarization mode dispersion in the light beam, in real time, to control motor 656, by feedback, to reduce or minimize polarization mode dispersion. Alternatively, particularly if polarization mode dispersion of the light beam is not changing very much in real time, the position of the moveable mirror is adjusted once, for example when the dispersion compensation module is installed, or the position of the moveable mirror is adjusted occasionally, for example manually by turning a screw, to compensate for a known average degree of polarization mode dispersion.

By moving the moveable mirror, for example mirror 652, relative to the other mirror, for example mirror 653, the path length traveled by beam 402 is made different from the path length traveled by beam 404, thereby compensating for polarization mode dispersion of the original input beam. As may be seen in FIG. 6C, moving mirror 652 changes the path length by several times the distance moved by the mirror, because the beam 402 reflects several times from mirror 652 before exiting module 650 at a location 660. In some embodiments of the invention, for example if a smaller amount of polarization mode dispersion compensation is needed, moving mirror 652 extends over only a portion of the left side of birefringent block 506, for example an upper portion in FIG. 6C, while the rest of the left side of birefringent block 506, for example a lower portion in FIG. 6C, is adjacent to a mirror that does not move, so beam 402 reflects fewer times, or only one time, from mirror 652, and there is less dispersion compensation for a given moving distance of mirror 652.

It should be noted that the devices shown in FIGS. 6A-6C may be most effective at compensating for polarization mode dispersion if the two parallel beams 402 and 404 entering the device correspond to the two eigenmodes with respect to polarization mode dispersion, of the input beam in optical fiber 102 in FIG. 1. In some embodiments of the invention, before the input beam is split into beams 402 and 404 by beam splitter 306 in FIG. 4, the input beam passes through a polarization controller, not shown, for example a controllable Faraday rotator, which rotates the polarization of the two eigenmodes, so that they better correspond to split beams 402 and 404. Optionally, the polarization is rotated back again to its original orientation, for example by another polarization controller, after the polarization mode dispersion is compensated. Optionally, the angle of rotation is optimized, for example by measuring the polarization mode dispersion of the input beam, or by measuring the remaining polarization mode dispersion of the output beam and using feedback to adjust the angle of rotation in the polarization controller. Optionally this is done dynamically in real time, using control module 110. Alternatively, particularly if the eigenmodes do not change very much in real time, the angle of rotation is adjusted once, for example when the dispersion compensation module is installed, or only occasionally.

As used herein, "dispersion" is a general term that includes both chromatic dispersion, which refers to the group delay depending on frequency, and polarization mode dispersion, which refers to the group delay depending polarization mode. As used herein, "dispersion compensating element" includes elements such as the set of mirrors 652 and 653, which change the relative group delay of beams 402 and 404, resulting in a change in the polarization mode dispersion of the output beam emerging from the dispersion compensating device, after one of the beams has passed through half-wave plate 406, or a different half-wave plate, and beams 402 and 404 have been recombined into a single beam by polarizing beam splitter 306, as shown in FIG. 3 and described above. The set of mirrors 652 and 653 is called a "dispersion compensating element" even if, when beams 402 and 404 interact with mirrors 652 and 653, they temporarily have the same polarization, because beam 404 has passed through half-wave plate 406, as shown in FIG. 3, before entering the dispersion compensating module.

Figure 7:
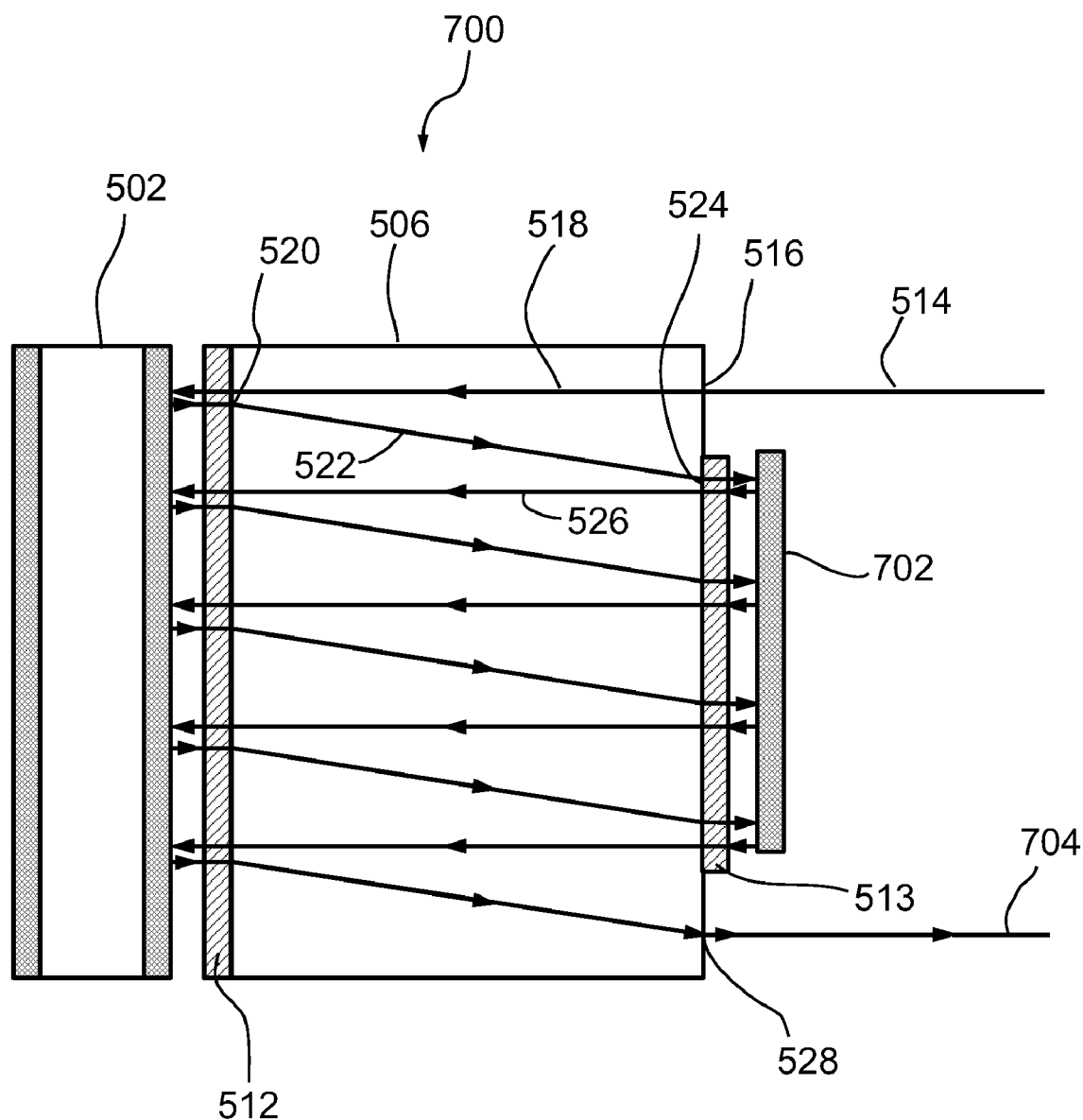
FIG. 7 schematically shows an alternative configuration of a dispersion compensation module, according to an exemplary embodiment of the invention.

FIG. 7 schematically shows an alternative dispersion compensating module 700. Module 700 differs from module 500 in that there is only a single GT etalon 502. Instead of GT etalon 504, there is a mirror 702, which reflects light back across block 506 to GT etalon 502. Module 700 has the potential advantage that it may be easier to manufacture than module 500, but module 500 has the potential advantage that, for GT etalons with the same characteristics, and for the same birefringent block 506, module 500 can produce twice as much dispersion compensation as module 700. Also, module 500 has the potential advantage that GT etalons 502 and 504 can be designed to have different characteristics, or can have their characteristics controlled separately in real time, which may be advantageous for the reasons described below in the description of FIG. 8.

Figure 8:
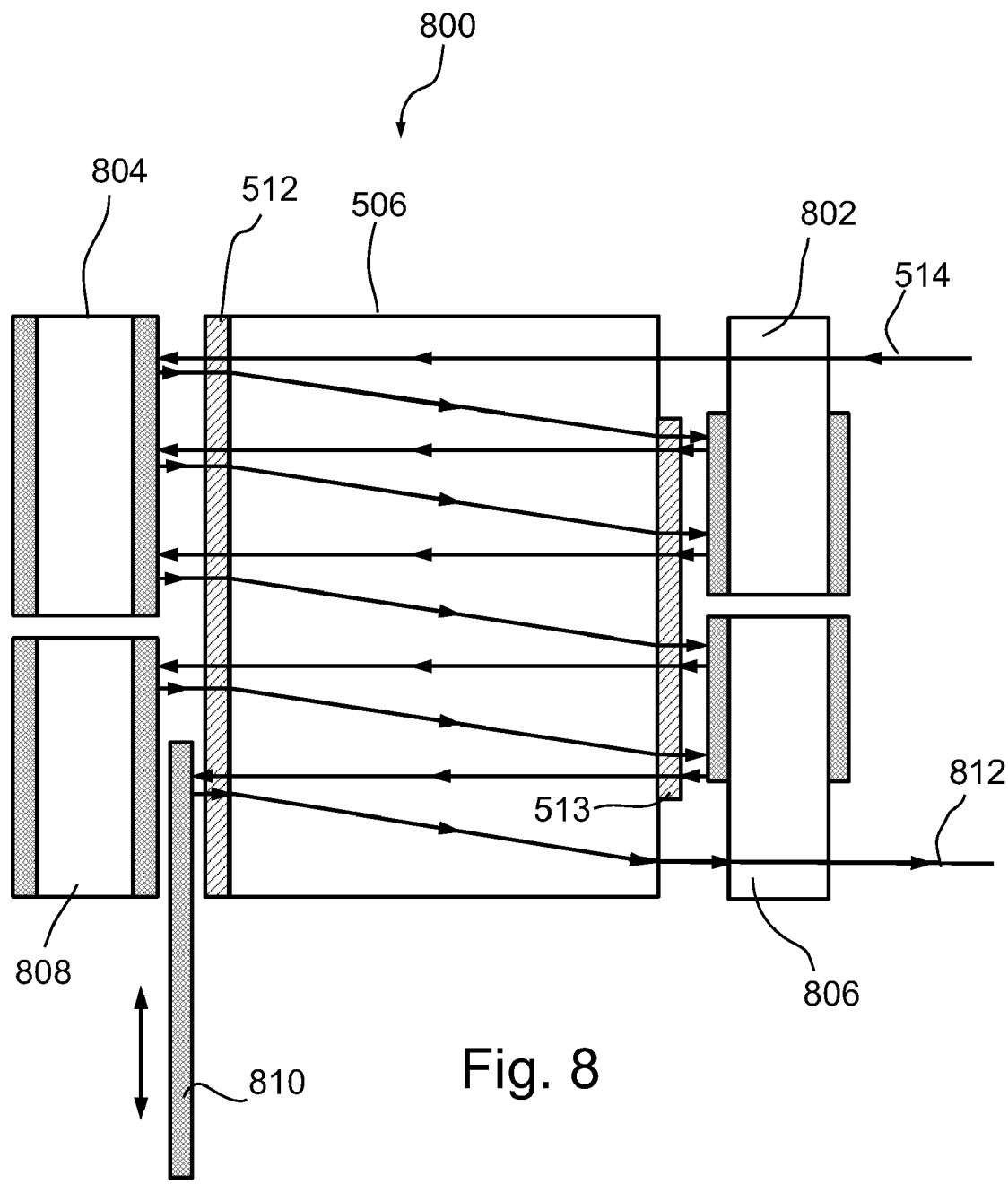
FIG. 8 schematically shows an alternative configuration of a dispersion compensation module, according to an exemplary embodiment of the invention.

FIG. 8 shows an alternative dispersion compensating module 800, with additional features, not found in module 500, which may be used to control the dispersion compensation, and/or to compensate for dispersion over a larger frequency bandwidth. Any of these additional features may be present in a dispersion compensating module, without all of them being present.

In module 800, instead of single GT etalons 502 and 504, one on each side of block 506, there are a plurality of GT etalons, for example two GT etalons 804 and 808, on the left side of block 506, and a plurality of GT etalons, for example two GT etalons 802 and 806, on the right side. Alternatively, there are different numbers of GT etalons on each side, for example one GT etalon on one side, and two on the other side. By using a plurality of GT etalons with different characteristics, and possibly with changeable characteristics that can be controlled independently, module 800 may enable better matching of dispersion compensation as a function of frequency, to the dispersion as a function of frequency found in the input beam. As a result, the residual dispersion of the output beam (group delay ripple) may be lower, and/or the dispersion compensation may be effective over a greater frequency range, allowing the optical network to function at greater channel bandwidth.

Module 800 also optionally includes a moveable mirror 810, which can cover an adjustable portion of GT etalons 804 and 808, ranging for example from 0% to 100%. For the covered portion of the GT etalons, light reflects from mirror 810, instead of interacting with the GT etalon. The position of mirror 810 affects the number of times the light interacts with a GT etalon, and consequently affects the degree of dispersion compensation in output beam 812. Mirror 810 is optionally moved by a motor, for example a motor with the characteristics described for the moving mirror in FIG. 6C.

Optionally, the moveable mirror is on the other side of block 506, covering a portion of GT etalons 802 and 806, or there are moveable mirrors, optionally separately controllable, on both the left and right sides of block 506. Additionally or alternatively, there are optionally separately controllable mirrors covering a portion of GT etalon 804 from above, and/or covering a portion of GT etalon 802 from above, providing additional degrees of freedom for controlling the dispersion compensation of module 800.

A GT etalon acts like an all-pass filter, with a phase shift Φ given by $$\Phi = 2\tan^{-1}\left[\sigma\tan\left(\frac{2\pi v}{c}nd\right)\right] \quad (1)$$

for light of frequency v, where c is the speed of light, and $$\sigma = \frac{1+\sqrt{R}}{1-\sqrt{R}} \quad (2)$$

Figure 9:
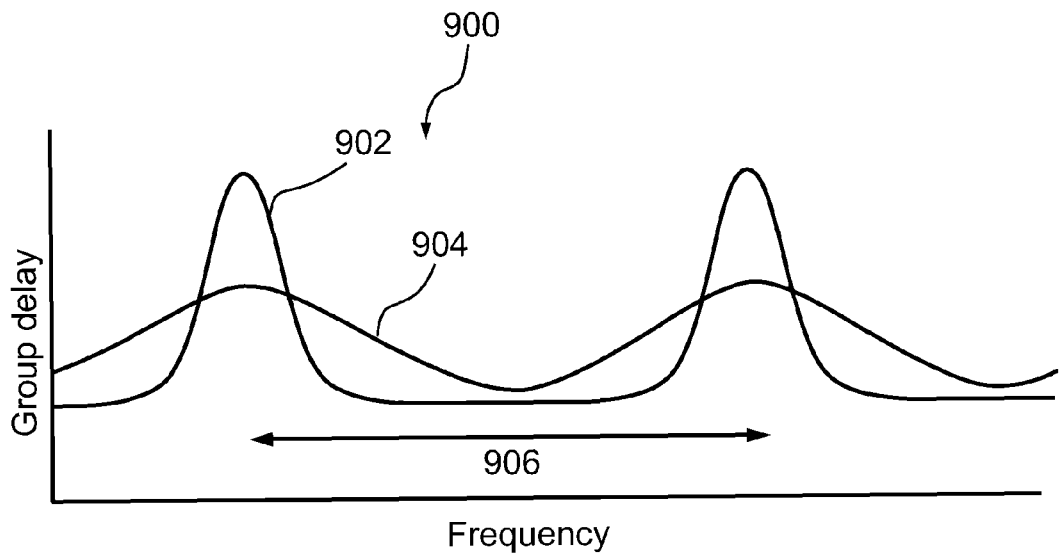
FIG. 9 schematically shows a plot of group delay as a function of frequency, for two GT etalons used in different exemplary embodiments of the invention.

The group delay as a function of frequency is given by $$GD(v) = \frac{d\Phi}{dv} = \frac{\sigma\tau_0}{1 + (\sigma^2 - 1)\sin^2\left(\frac{1}{2}v\tau_0\right)} \quad (3)$$

where $\tau_0 = 4\pi nd/c$ is the time for light to travel twice the width d of the GT etalon. FIG. 9 shows the group delays 902 and 904 as a function of frequency, for two different values of R, one of them fairly close to 1 (curve 902) and one of them closer to 0 (curve 904), for $v\tau_0 \gg 1$. Regardless of the value of R, the group delay is nearly a periodic function of frequency, with period 906, called the free spectral range (FSR) of the etalon, given by $$\frac{1}{2}c/nd = 2\pi/\tau_0,$$

assuming that $v\tau_0 \gg 1$. As will be explained, this periodicity of the group delay has the potential advantage that the GT etalon can be used to compensate for dispersion in more than one channel at once.

For an optical network with many channels, it may be important to compensate for dispersion within the bandwidth of each channel, to avoid distorting the signal and generating bit errors, but it may not matter if different channels have different overall group delays, particularly if only chromatic dispersion is being compensated, not polarization mode dispersion. In such a case, the GT etalons are optionally designed so that free spectral range 906, given by $$\frac{1}{2}c/nd,$$

is equal to the channel spacing. Then, if the dispersion compensating module effectively compensates for dispersion within the bandwidth of one channel, it may also effectively compensate for dispersion within the bandwidth of each of the other channels, assuming that all of the channels together span a relatively small range of frequencies, and assuming that the dispersion being compensated in the optical network is a slowly varying function of frequency.

For a given GT etalon, the group delay as a function of frequency can vary, depending on R, as shown in FIG. 9. In addition, by changing nd, the maxima and minima of curves 902 and 904 in FIG. 9 can be shifted to the left or right. Of these parameters, the index of refraction n, at least, can be controlled in real time by changing the temperature of the etalon. It should be noted that, if $v\tau_0 \gg 1$, only a small relative change in nd is required to shift the periodic maxima and minima in group velocity to any desired position. In particular, the condition that the channel spacing is close to $$\frac{1}{2}c/nd$$

can still be satisfied with this small relative change in nd.

Choosing R, n, and d for each GT etalon, and choosing the lengths of the different etalons, and the degree of birefringence of the birefringent block, which controls the number of times N the light beam interacts with each etalon, provides a number of degrees of freedom for the design of the dispersion compensating module. These degrees of freedom may be useful for providing a better match to any of a wide variety of group delays as fixed functions of frequency across the bandwidth of one channel. And, as noted above, this may automatically provide a good match to the group delay of the optical network as a function of frequency (up to the addition of a constant) for each of the other channels, if the channel spacing is close to $$\frac{1}{2}c/nd.$$

The more degrees of freedom there are, the closer the match can be between the group delay as a function of frequency for the dispersion compensating module, and the group delay as a function of frequency that is needed to compensate for the dispersion of the channels used by the optical network. A better match between these two functions may reduce the residual dispersion (group delay ripple) in the optical network, or increase the channel bandwidth over which a given residual dispersion can be achieved, or both.

The above remarks concern compensating for a fixed group delay as a function of frequency for each channel, by the choice of fixed design parameters for the dispersion compensating module. In addition, the dispersion compensating module can compensate for group delay as a function of frequency that varies in time, by using control parameters that can be changed in real time. As described above, these control parameters may include the temperature of one or more GT etalons, controlled for example by thermoelectric devices as shown in FIG. 5, and the position of one or more moveable mirrors, which block off parts of the GT etalons from interacting with the light beam. The more of these control parameters that are used, the better it may be possible for the group delay of the dispersion compensating module, as a function of frequency over the bandwidth of each channel, to be matched to what is needed to compensate for dispersion in the optical network that is changing with time. This time-varying dispersion compensation is optionally done by control module 110 in FIG. 1 or FIG. 2, using a feedback loop that uses a measure of residual dispersion.

A dispersion compensation module such as module 500 in FIG. 5, or module 800 in FIG. 8, can be used to produce a group delay that has (within a range) any desired first derivative with respect to frequency (i.e. chromatic dispersion), and any desired second derivative, by independently controlling $\tau_0$ for each etalon. Typically, the desired second derivative is close to zero, so that, for a channel bandwidth that is small compared to the channel spacing, the residual dispersion (group delay ripple) will be small. Furthermore, the chromatic dispersion compensation can be nearly the same for every channel over a broad range of channels, if the channels are equally spaced in frequency, with channel spacing small compared to the frequency. For some choices of the parameters, the chromatic dispersion compensation can be nearly a linear function of a control parameter within the range, which includes both positive and negative chromatic dispersion.

To illustrate the order of magnitude of dispersion compensation that a module such as module 500 or module 800 might produce, consider light having wavelength approximately $\lambda=1000$ nm, in the near infrared, and etalons of thickness d=1 mm, and index of refraction n=1.5. Then $\tau_0 = 4\pi nd/c = 0.06$ nanoseconds, and $v=c/\lambda=3\times10^{14}$ Hz, so $v\tau_0=1.8\times10^4$. Then the channel spacing is 17 GHz, and there are, for example, about 1800 channels within a frequency range equal to 10% of $v$. With R=0.3, a moderately small value chosen to make GD(v) fairly sinusoidal, the maximum slope in GD(v) is approximately $3\tau_0^2$ for a single interaction of light with an etalon. If the light interacts 10 times with each of two etalons in the dispersion compensating module, then the total dispersion compensation can be as great as $60\tau_0^2$. An optical fiber of length L, designed to carry light of frequency $v$, might be expected to have a chromatic dispersion of a fraction of L/cv, for example 0.2 L/cv. Setting 0.2 L/cv equal to $60\tau_0^2$ and solving for L, we find that the dispersion compensating module can compensate for the chromatic dispersion of an optical fiber of length L=100 km. Although this estimate may be overly optimistic, a dispersion compensating module similar to module 500 or module 800 may be able to compensate for chromatic dispersion in an optical fiber more than 5 km long, or more than 10 km long, or more than 20 km long. If the width of each channel is about 10% of the spacing between channels, i.e. 1.7 GHz, and dispersion is compensated exactly at the center of each channel, then we might expect the residual dispersion near the edge of each channel, due to the $d^3(GD)/dv^3$ term for the etalons, to be on the order of 1% of the uncompensated chromatic dispersion. The parameters listed above are merely representative, and in an actual optical network may be greater or smaller by up to a factor of 1.2, or by up to a factor of 1.5, or by up to a factor of 2, or by up to a factor of 5, or by up to a factor of 10, or by up to a factor of 20, or by more than a factor of 20.

If a dispersion compensation module has two GT etalons, for example GT etalons 502 and 504 in FIG. 5, the total group delay of the module, from Eq. (3), is $$GD(v) = \frac{N_1\sigma_1\tau_1}{1+(\sigma_1^2-1)\sin^2\left(\frac{1}{2}v\tau_1\right)} + \frac{N_2\sigma_2\tau_2}{1+(\sigma_2^2-1)\sin^2\left(\frac{1}{2}v\tau_2\right)} \quad (4)$$

Here, the subscripts 1 and 2 refer to the two etalons, which may have different parameters R, n, and d, and hence different values of $\sigma$ and $\tau$. The number of interactions N of the light beam with each etalon may also differ for the two etalons, for example if there are sliding mirrors as in FIG. 8. As will be explained below, $\tau_1$ and $\tau_2$ are both chosen to be relatively close to $\tau_0$, which is $2\pi$ divided by the spacing in frequency between adjacent channels, assumed to be the same for the whole range of channels. This assures that the group delay is nearly a periodic function of frequency, with the period equal to the channel spacing, over a relatively broad range of frequencies covering a large number of channels. The small relative differences between $\tau_1$ and $\tau_0$, or between $\tau_2$ and $\tau_0$, determine the phase of each of the two terms in Eq. (4), associated with the two etalons. These phases can each take on any value from 0 to $2\pi$, because even a small relative change in $\tau_1$ or $\tau_2$ can produce a large change in $$\sin^2\left(\frac{1}{2}v\tau_1\right)$$

if $v\tau_0\gg1$.

Using etalons with relatively high reflection coefficient R, for example with R>0.5, has the potential advantage that, for a given N, $v$ and $\tau$, the first derivative of the group delay (the chromatic dispersion compensation) will generally be greater than for lower R. For example, if the channels are centered on the steep parts of the sharp peaks of curve 902, then the first derivative of the group delay can be made arbitrarily high by making R close enough to 1, for example by using R greater than 0.7, or greater than 0.8, or greater than 0.9. However, with relatively high R, the first derivative of the group delay will generally be a steeper function of $\tau$, and may be more difficult to control precisely, by changing $\tau$, than if a lower value of R is used. Also, higher order derivatives of group delay with respect to frequency may be greater, if R is greater, possibly leading to greater group delay ripple, although it is possible to reduce such group delay ripple by using channels of narrower bandwidth compared to the spacing between channels. On the other hand, if R is very small, much less than 0.5, then the first derivative of group delay will be smaller, and a larger module, with a greater number of bounces N of the light beam, will be needed to obtain the same chromatic dispersion compensation. Optionally, a moderately low value of R is chosen as a compromise between these extremes, for example R=0.1, 0.2, or 0.3. Such a choice of R may produce a relatively high maximum chromatic dispersion compensation, which is still a relatively smooth function of $\tau$, with relatively low values of the higher derivatives of group delay.

To illustrate how the group delay, and its first derivative, are controlled by controlling $\tau_1$ and $\tau_2$, we will consider the case where $R_1=R_2=R\ll1$, and only keep the lowest order terms in R. But it should be understood that a similar analysis could be done taking into account some or all higher order terms in R, and/or values of R which differ for the two etalons. In this case, from Eq. (4), $$GD(v) = \left[1+2\sqrt{R}\cos(v\tau_1)\right]N_1\tau_1 + \left[1+2\sqrt{R}\cos(v\tau_2)\right]N_2\tau_2 \quad (5)$$

$$\frac{d(GD)}{dv} = -2\sqrt{R}\left[N_1\tau_1^2\sin(v\tau_1) + N_2\tau_2^2\sin(v\tau_2)\right] \quad (6)$$

$$\frac{d^2(GD)}{dv^2} = -2\sqrt{R}\left[N_1\tau_1^3\cos(v\tau_1) + N_2\tau_2^3\cos(v\tau_2)\right] \quad (7)$$

We wish to choose a $\tau_1$ and $\tau_2$ for which d(GD)/dv will just compensate for chromatic dispersion, for a frequency $v_0$ at the center of a channel in the middle of the frequency range of all channels that are being used, and we want d(GD)/dv to have nearly the same value at the center frequency of all channels, over a wide a range of channels. This assumes that the range of frequency of all the channels being used is small compared to $v_0$, and that the chromatic dispersion is nearly the same for all the channels in this range. A different procedure for choosing $\tau_1$ and $\tau_2$ is optionally used if those assumptions are not true. We also want $d^2(GD)/dv^2$ to compensate for the rate of change of chromatic dispersion with frequency, at $v_0$ and at the center frequencies of the other channels to good approximation, to keep group delay ripple low. Then, from Eqs. (6), $\tau_1$ and $\tau_2$ optionally satisfy $$N_1\sin(v\tau_1) + N_2\sin(v\tau_2) = -\frac{1}{2}R^{-1/2}\tau_0^{-2}(CD)_{v_0} \quad (8)$$

at $\nu=\nu_0$, where $(CD)_{\nu 0}$ is the chromatic dispersion at $\nu_0$. From Eq. (7), $\tau_1$ and $\tau_2$ optionally also satisfy $$N_1 \cos(\nu\tau_1) + N_2 \cos(\nu\tau_2) = -\frac{1}{2} R^{-1/2} \tau_0^{-3} \frac{d(CD)}{d\nu}\bigg|_{\nu=\nu_0} \quad (9)$$

at $\nu=\nu_0$. In Eqs. (8) and (9), we have assumed, as noted above, that $\tau_1$ and $\tau_2$ are both nearly equal to $\tau_0$, with the differences between $\tau_0$, $\tau_1$ and $\tau_2$ being important only in the sine and cosine functions. If Eqs. (8) and (9) are satisfied at $\nu=\nu_0$, then they are also satisfied to good approximation at the center frequencies of other nearby channels, $\nu=\nu_0 \pm 2\pi k/\tau_0$, for $k=1, 2, 3, \ldots$, because the sine and cosine functions in Eqs. (8) and (9) are periodic in $\nu$ with periods nearly equal to the channel spacing $2\pi/\tau_0$. In order to estimate how far from $\nu=\nu_0$ Eqs. (8) and (9) are satisfied to good approximation at the channel frequencies, $\sin(\nu\tau_1)$ may be written as $$\sin(\nu\tau_1) = \sin[(\nu-\nu_0)\tau_0 + (\nu-\nu_0)(\tau_1-\tau_0) + \nu_0\tau_1] = \sin[(\nu-\nu_0)\tau_0 + \nu_0\tau_1] \cos[(\nu-\nu_0)(\tau_1-\tau_0)] - \cos[(\nu-\nu_0)\tau_0 + \nu_0\tau_1] \sin[(\nu-\nu_0)(\tau_1-\tau_0)] \quad (10)$$

As long as $(\nu-\nu_0)(\tau_1-\tau_0) \ll 1$, $\sin(\nu\tau_1) \approx \sin[(\nu-\nu_0)\tau_0 + \nu_0\tau_1]$, which is periodic in $\nu$ at the channel spacing $2\pi/\tau_0$. Similarly, $\cos(\nu\tau_1)$ is well approximated by a function that is periodic at the channel spacing as long as $(\nu-\nu_0)(\tau_1-\tau_0) \ll 1$, and $\sin(\nu\tau_2)$ and $\cos(\nu\tau_2)$ are well approximated by functions that are periodic at the channel spacing as long as $(\nu-\nu_0)(\tau_2-\tau_0) \ll 1$. So Eqs. (8) and (9) are satisfied to good approximation at any channel frequency that is well within both $1/(\tau_1-\tau_0)$ and $1/(\tau_2-\tau_0)$ of the channel frequency $\nu_0$. Optionally, values of $\tau_1$ and $\tau_2$, satisfying Eqs. (8) and (9) at $\nu=\nu_0$, are chosen to be as close as possible, or nearly as close as possible, to $\tau_0$. Such a choice has the potential advantage that the chromatic dispersion is well compensated, and the group delay ripple is kept relatively low, not only for the channel at frequency $\nu_0$, but for about as broad a range as possible of other channel frequencies around $\nu_0$.

To illustrate how to find values of $\tau_1$ and $\tau_2$ that satisfy Eqs. (8) and (9) at $\nu=\nu_0$, while being as close as possible to $\tau_0$, we consider, for simplicity, the case where $N_1=N_2$. It will be understood, to one of skill in the art, how to generalize this procedure to the case where $N_1$ differs from $N_2$. Then, from Eq. (8) at $\nu=\nu_0$, $$\sin(\nu_0\tau_1) + \sin(\nu_0\tau_2) = -\frac{1}{2} R^{-1/2} \tau_0^{-2} N^{-1} (CD)_{\nu_0} \quad (11)$$

and from Eq. (9) at $\nu=\nu_0$, $$\cos(\nu_0\tau_1) + \cos(\nu_0\tau_2) = -\frac{1}{2} R^{-1/2} \tau_0^{-3} \frac{d(CD)}{d\nu}\bigg|_{\nu=\nu_0} \quad (12)$$

It is noted that the rate of change of chromatic dispersion with frequency, $d(CD)/d\nu$, is often on the order of the chromatic dispersion CD divided by $\nu_0$. In this case, the right hand side of Eq. (12) will be smaller than the right hand side of Eq. (11) by a factor on the order of $\nu_0 \tau_0$, which is much greater than 1 if the channel spacing is small compared to $\nu_0$. In this case, to good approximation the right hand side of Eq. (12) may be set equal to zero. The parameters $\tau_1$ and $\tau_2$ then satisfy Eq. (12) when $$\tau_1 + \tau_2 \approx (2j+1) \pi \nu_0^{-1} \quad (13)$$

for some integer $j=0, \pm 1, \pm 2, \ldots$. In this case, $\sin(\nu_0\tau_1)=\sin(\nu_0\tau_2)$, and Eq. (11) is satisfied when $$\tau_1 \approx 2k\pi\nu_0^{-1} - \arcsin\left[\frac{1}{4} R^{-1/2} \tau_0^{-2} N^{-1} (CD)_{\nu_0}\right] \quad (14a)$$

or $$\tau_1 \approx (2k+1)\pi\nu_0^{-1} + \arcsin\left[\frac{1}{4} R^{-1/2} \tau_0^{-2} N^{-1} (CD)_{\nu_0}\right] \quad (14b)$$

for some integer $k=0, \pm 1, \pm 2, \ldots$. If the right hand side of Eq. (12) is not approximated as zero, then Eqs. (13), (14a) and (14b) are replaced by different expressions for $\tau_1$ and $\tau_2$, which depend on $d(CD)/d\nu$ as well as on CD.

Optionally, in order to make $\tau_1$ and $\tau_2$ about as close as possible to $\tau_0$, j is chosen to be an integer close to $\nu_0\tau_0/\pi$, and k is chosen to be an integer close to $\nu_0\tau_0/2\pi$. Then $(\tau_1-\tau_0)$ and $(\tau_2-\tau_0)$ will both be less than or comparable to $1/\nu_0$, and the module will provide nearly the same first and second derivatives of group delay for all channels, provided their range is small compared to $\nu_0$.

Optionally, the number of bounces N in the etalons is chosen, given the values of R and $\tau_0$, chosen as described above, so that the argument of the arcsin function in Eqs. (14a) and (14b) is less than 1, for the maximum chromatic dispersion $(CD)_{\nu 0}$ that the module will ever need to compensate. If N is adjustable, for example as in module 800 of FIG. 8, then the maximum N is chosen this way. It should be noted that, even if N for a single module is not great enough to compensate for the maximum chromatic dispersion, additional modules may be used in series, and N in the above equations may be considered to be the total N added up from all the modules.

Figure 10:
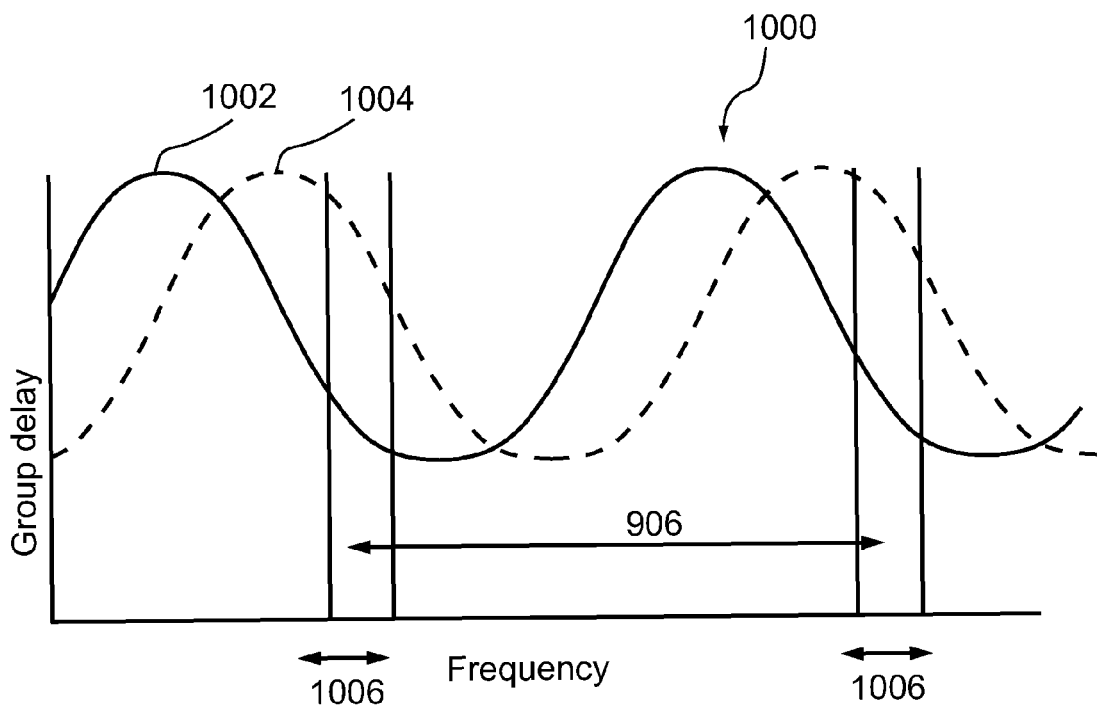
FIG. 10 schematically shows a plot of group delay as a function of frequency, for two different GT etalons used together in an exemplary embodiment of the invention.

FIG. 10 schematically shows plots, as functions of frequency $\nu$, of the contributions 1002 and 1004 from the two etalons to the group delay $GD(\nu)$, corresponding to the two terms on the right hand side of Eq. (5). For these plots, it is assumed that $N_1=N_2$, and $d^2(GD)/d\nu^2=0$ at the central frequencies of the channels 1006. It should be noted that, at the central frequencies of the channels, the second derivatives of curves 1002 and 1004 have the same magnitude and opposite signs, so that they add to zero, corresponding to Eq. (12) with its right hand side set equal to zero. The group delay ripple may then be dominated by the third derivative $d^3(GD)/d\nu^3$, and it may be small if the channel width 1006 is at least moderately small compared to the channel spacing 906.

The first derivatives of curves 1002 and 1004, producing the chromatic dispersion compensation, have the same magnitude and the same sign, corresponding to $\sin(\nu_0\tau_1)=\sin(\nu_0\tau_2)$, as noted above after Eq. (13). For fixed N and fixed R, the sign and magnitude of the chromatic dispersion compensation may be changed by changing $\tau_1$ and $\tau_2$ so as to change the phase difference between curves 1002 and 1004, while keeping the average phase of curves 1002 and 1004 fixed, at a value that satisfies Eq. (12). In some embodiments of the invention, $\tau_1$ and $\tau_2$, and the phases of curves 1002 and 1004, are kept fixed, at values that satisfy Eq. (12), and the magnitude of the chromatic dispersion compensation is changed by changing N, using a moveable mirror as shown in FIG. 8.

It should be noted that, because $GD(\nu)$ is periodic in $\nu$ at or nearly at the channel spacing 906, the first and second derivatives of GD(v) are nearly the same for the central frequency of every channel, over a range of many channels, with the channel spacing being small compared to the frequencies of the channels. The range of frequencies v shown in FIG. 10 is only about twice the channel spacing, and is much less than the frequencies of the channels shown.

In some embodiments of the invention, instead of setting the second derivative of the group delay to zero, or to another value, in order to specify the values of the control parameters of the etalons, the group delay itself is set to a desired value. This is done, for example, in order to use the same dispersion compensation module to compensate for both chromatic dispersion and polarization mode dispersion, with a different group delay used for the two polarization modes. Alternatively, a separate module, such as module 650 in FIG. 6B, is used for polarization mode dispersion compensation. This has the potential advantage that the second derivative of the group delay can then be made small in the chromatic dispersion compensation module, keeping the group delay ripple small.

In some embodiments of the invention, the group delay, the first derivative of the group delay, and the second derivative of the group delay are all set at desired values, using three independent control parameters, chosen, for example, among $\tau_1, \tau_2, N_1$, and $N_2$, or combinations of them. Such a method may work best if R is moderately large for at least one of the etalons, and different for the two etalons, so that the shape of GD(v), as well as its amplitude and phase, can be changed by adjusting $N_1$ and/or $N_2$. There may also be more than two etalons, as in FIG. 8, which may have different values of R, providing additional degrees of control, and this may also be done by using more than one dispersion compensating module in series. By contrast, if the group delay GD(v) is of a fixed shape, for example sinusoidal, as a function of frequency, and its periodicity is fixed by the channel spacing, then it may not be possible to control the second derivative of the group delay at the center channel frequency, independently from the group delay at the center channel frequency.

Changing the shape of GD(v) by adjusting $N_1$ and/or $N_2$ has other potential advantages, even without using the same module to compensate for both chromatic dispersion and polarization mode dispersion. For example, it may then be possible to independently control the first derivative, second derivative, and third derivative of the group delay, or even higher derivatives, thereby reducing the group delay ripple, in a chromatic dispersion compensator. But using moderately small R, and having GD(v) nearly a sinusoidal function, has the potential advantage that the feedback loops used to control the module, as described for example in FIG. 11 below, may be more linear, and/or easier to implement.

It should be noted that the $\tau$'s and N's may have different characteristics as control parameters, due to the fact that N is an integer, while $\tau$ may be controlled continuously, for example by controlling the temperature. For example, N may not allow as fine a degree of control as $\tau$, but may allow more robust control in the presence of noise.

Figure 11:
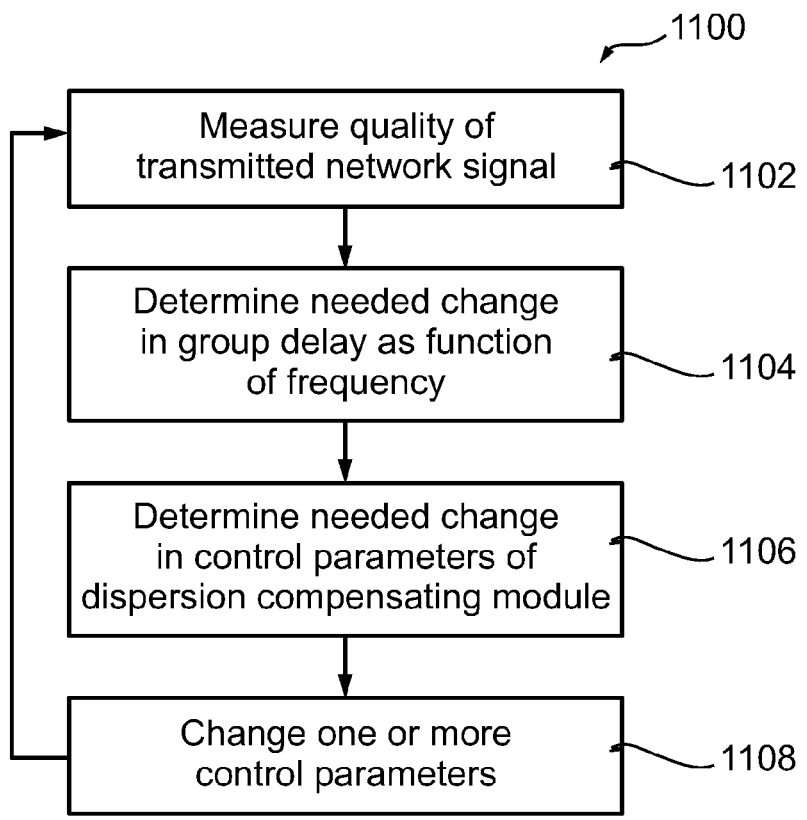
FIG. 11 shows a flowchart for a control loop for dispersion compensation in an optical network, using the dispersion compensation device of FIG. 1 or FIG. 2.

FIG. 11 shows a flow chart for a general control algorithm that is used to control the dispersion compensation in real time, according to an exemplary embodiment of the invention. The response time of the module is limited, for example, by the thermal response time of the etalons, if their characteristics are controlled by changing their temperature. For sufficiently small, thin, etalons, the response time is optionally less than one minute, or less than 10 seconds, or less than 1 second. At 1102, a measure is made of the quality of the transmitted signal in an optical network. This measure is optionally a bit error rate, for example, or eye-opening, or Q-factor, or any other measure of quality known in the art of optical communications. The measure is optionally obtained from data taken by an appropriate optical sensor connected to control module 110, which samples the optical signal downstream of the dispersion compensation device, and the data from the sensor is optionally processed by control module 110.

At 1104, the needed dispersion compensation, i.e. group delay as a function of frequency within each channel, is determined. Optionally, this is done by a direct measurement of residual dispersion in one or more of the channels. Alternatively or additionally, the needed dispersion compensation is determined empirically, by temporarily changing the dispersion compensation in different ways, and seeing what produces the best quality of the transmitted signal. For example, the first derivative of the group delay as a function of frequency within the channel is first increased, and then decreased, and the quality of the transmitted signal is compared in the two cases. Optionally, other changes in dispersion compensation are also made, for example the second derivative in group delay as a function of frequency is held at two or more different values, for each of two or more different values of the first derivative, and an optimal value of the first and second derivatives is found, which maximizes the signal quality. Other such methods will be apparent to those of skill in the art of optical communications.

At 1106, a calculation is made of the change in control parameters, for example the temperature of one or more etalons, or the position of one or more moveable mirrors, needed to achieve the optimal dispersion compensation found in 11104.

In some embodiments of the invention, the optimal change in dispersion compensation is not calculated at all, but the optimal change in the control parameters is directly found empirically, for example by finding the set of control parameters which maximizes the measure of signal quality.

At 1108, the control parameters are changed by the amount calculated to be optimal. Control then returns to 1102, and the measure of signal quality is measured again.

In some embodiments of the invention, the control algorithm for the feedback loop is more complicated than the one illustrated in FIG. 11. For example, instead of changing the control parameters to the values calculated to produce the maximum signal quality, the control parameters are changed by a smaller amount in the indicated direction, to prevent overshooting. Optionally, the past history of the control loop is taken into account in deciding how much to change the control parameters. Various other control algorithms as known in the art of systems control and feedback may also be used.

Figure 12A:
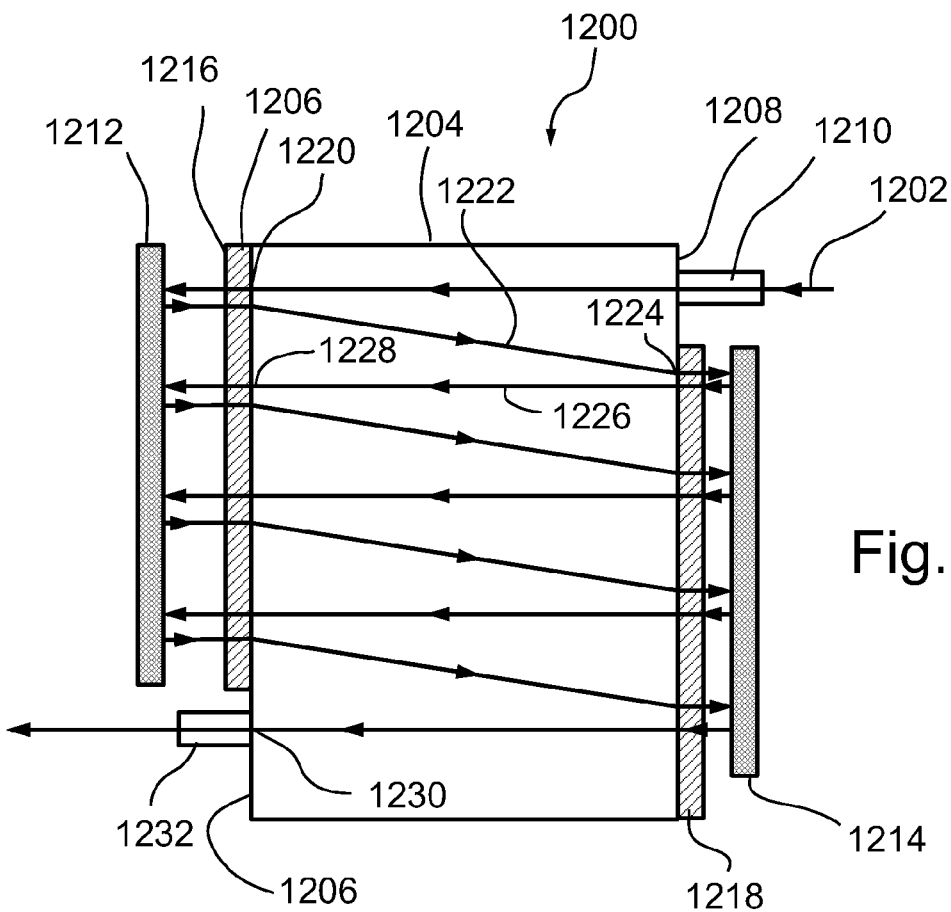
FIGS. 12A and 12B show devices for laterally displacing a light beam, according to an exemplary embodiment of the invention.
Figure 12B:
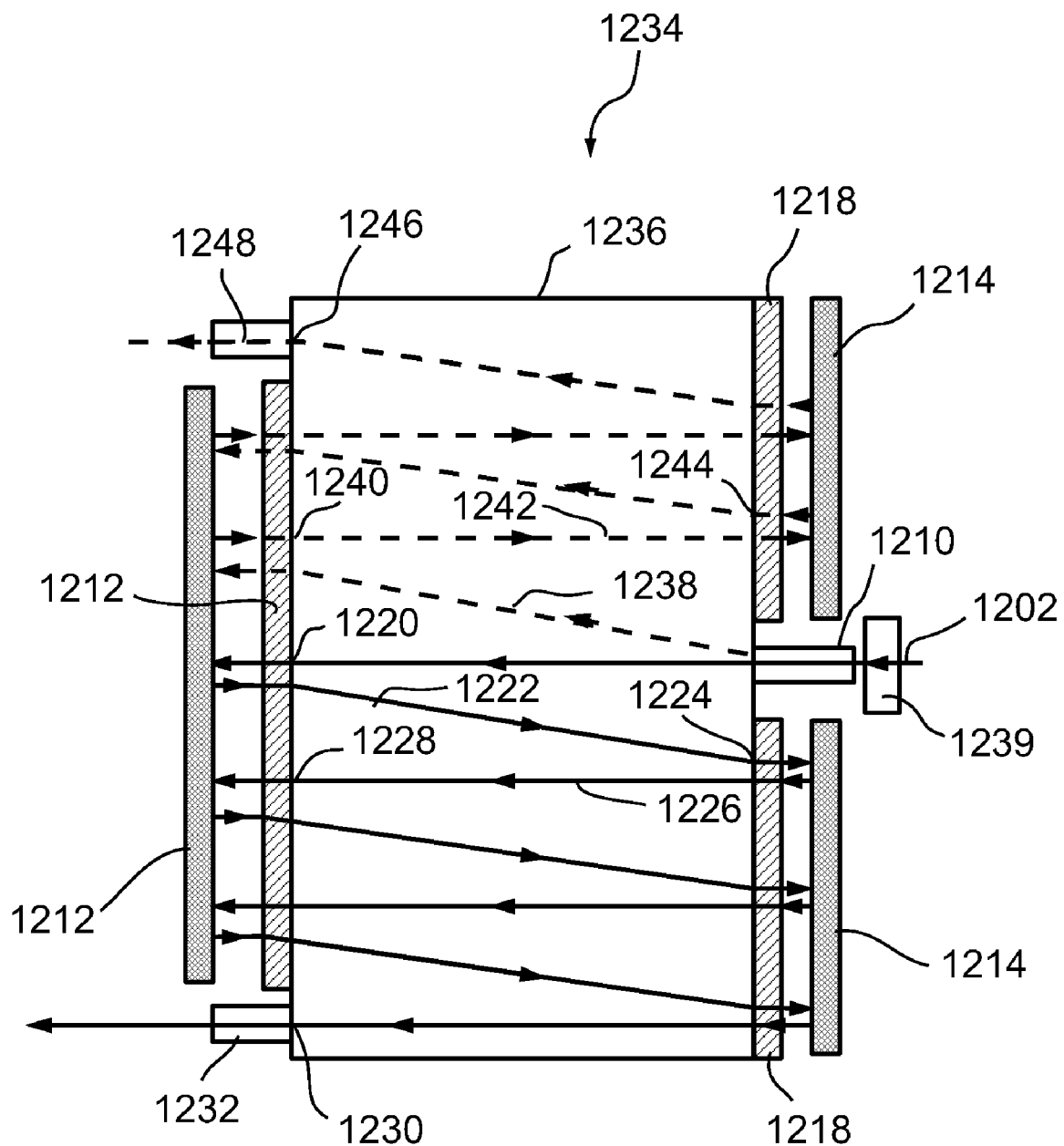

FIGS. 12A and 12B show different configurations of a device for laterally displacing a light beam, by an amount that can be changed easily by modifying the device, according to an exemplary embodiment of the invention. The amount of displacement can be changed in real time in some embodiments of the invention. In some embodiments of the invention the direction of displacement depends on the polarization of the input beam, which can also be changed in real time by known methods. This device is similar to the dispersion compensation modules shown in FIGS. 5, 7, and 8, but with the GT etalons replaced by mirrors that reflect the light back without changing its dispersion. Although the modules shown in FIGS. 5, 7, and 8 have output beams directed in a direction opposite to the input beam, while the devices shown in FIGS. 12A and 12B have the output beams directed in the same direction as the input beam, any of these devices may have the output beams directed in either the same or opposite direction as the input beam.

FIG. 12A schematically shows a device 1200 for lateral displacement of an input light beam 1202. The device comprises a block 1204 of a birefringent material, such as calcite or YVO4, with two parallel planar surfaces 1206 and 1208 on opposite sides of the block. Light beam 1202 is linearly polarized when it enters block 1204 through input port 1210, on surface 1208 near an end that is shown on top in the drawing. Light beam 1202 is propagating substantially perpendicular to surface 1208 just before it enters block 1204, and, in FIG. 12A, its polarization is in a direction such that light beam 1202 is not refracted by the birefringent material, but continues to propagate substantially perpendicular to surface 1208, inside block 1204. Here, "substantially perpendicular" means much closer to perpendicular than the oblique angle at which the light would propagate inside the block, if it had a polarization which would cause it to be refracted by the birefringent material, for example, between 1 degree and 2 degrees, or between 2 degrees and 5 degrees, or between 5 degrees and 10 degrees.

Device 1200 has a first planar mirror 1212, adjacent and parallel to surface 1206, and a second planar mirror 1214 adjacent and parallel to surface 1208. Between mirror 1212 and surface 1206, there is a first quarter wave plate 1216, and between mirror 1214 and surface 1208, there is a second quarter wave plate 1218. Mirror 1214 and quarter wave plate 1218 do not block light from entering block 1204 at input port 1210, because, for example, each of mirror 1214 and quarter wave plate 1218 does not extend as far as input port 1210, or has an opening through which light passes at input port 1210.

When light beam 1202 first reaches surface 1206, at a location 1220, it passes through quarter wave plate 1216, reflects from mirror 1212, passes back along nearly the same path through quarter wave plate 1216, and back into block 1204, at location 1220. Location 1220 is a potential exit point, because, if mirror 1212 were removed from location 1220, then the light would exit from block 1204, and would not re-enter block 1204. Because the light beam has passed twice through quarter wave plate 1216, when it re-enters 1204 it is linearly polarized in a direction perpendicular to the direction of polarization that it had when passing through input port 1210. Due to the birefringence of block 1204, the light beam, now labeled 1222, is refracted by block 1204, propagating at an oblique angle to surface 1206. Consequently, light beam 1222 reaches surface 1208 at a location 1224, rather than retracing the path of light beam 1202 to the location of input port 1210.

Location 1224, like location 1220, is a potential exit point for the light. However, quarter wave plate 1218 and mirror 1214 do extend as far as location 1224, so light beam 1222, like light beam 1202 at location 1220, passes through the quarter wave plate, in this case quarter wave plate 1218, reflects from the mirror, in this case mirror 1214, and passes back through the quarter wave plate, re-entering block 1204 at location 1224, propagating perpendicular to surface 1208 just before it enters block 1204. As a result of passing twice through quarter wave plate 1218, the polarization of the light beam, now labeled 1226, is again linear but in a direction perpendicular to the direction of polarization of light beam 1222, and parallel to the direction of polarization of the input light beam 1202. So light beam 1226 propagates perpendicular to surface 1208, straight across block 1204 to location 1228, another potential exit point on surface 1206, but lower down, with respect to the orientation of FIG. 12A, than location 1220.

The process described above repeats, with the light beam moving further down block 1204, until the light beam reaches a potential exit point location which is not covered by a mirror. In the case illustrated in FIG. 12A, location 1230, on surface 1206, is not covered by mirror 1212, for example because mirror 1212 does not extent that far, or because there is an opening in mirror 1212, at location 1230, which lets the light through. Location 1230 has an output port 1232, where, for example, the light goes on to interact with another optical element, after being displaced laterally by the distance from location 1220 to location 1230. Quarter wave plate 1216 optionally also does not cover location 1230, so light exiting block 1204 at location 1230 remains linearly polarized in the same direction as it had the last time it traversed block 1204, which in this case is the same as the polarization of input beam 1202.

It should be noted that device 1200 can be built to displace the input light beam by a variety of different possible distances, and to have an output beam propagating in the same direction as the input beam, or the opposite direction, depending on which of the potential exit points have a mirror covering them. In addition, by using a moveable mirror for mirror 1212 and/or mirror 1214, the displacement of the light beam can be changed dynamically. It should also be noted that, in contrast to a device with two parallel mirrors which a light beam enters and exits at an oblique angle to the mirror surfaces, the input beam enters the birefringent block in device 1200 substantially perpendicular to one of its faces, and leaves the block substantially perpendicular to one of its faces. This fact may make it easier to couple device 1200 to optical fibers and to other optical elements. All of these advantages to device 1200 may apply also to the device shown in FIG. 12B and described below.

FIG. 12B shows a device 1234, similar to device 1200, with a block 1236 of birefringent material, but with two output ports 1232 and 1248, displaced laterally in opposite directions from an input beam 1202. Device 1234 sends light from the input beam to either of the output ports, depending on which of two polarization states it is in. If the input beam is in a polarization state that is a linear combination of the two states, or is unpolarized, then device 1234 splits the input beam into the two polarization states and sends part of the light to each output port.

If input beam 1202 enters device 1234 with the same linear polarization state as the input beam shown entering device 1200 in FIG. 12A, then the light follows an analogous path to the light in device 1200, first crossing block 1236 to location 1220, reflecting from mirror 1212 and having its polarization changed by quarter wave plate 1216, following path 1222 back across block 1236 at an oblique angle, and so on, eventually reaching location 1230 and exiting device 1234 through output port 1232.

If input beam 1202 has a different linear polarization state when it enters device 1234, orthogonal to the polarization state of the input beam in FIG. 12A, then it crosses block 1236 at an oblique angle upward in the drawing, following path 1238, rather than downward. The light then reaches surface 1206 of block 1236 at location 1240, and exits block 1236, passing through quarter wave plate 1216, reflecting from mirror 1212, passing back through quarter wave plate 1216, and re-entering block 1236, with its direction of polarization rotated by 90 degrees by the two passages through the quarter wave plate. The light then propagates straight across block 1236 on path 1242, reaching location 1244, and so on, eventually exiting block 1236 at location 1246. Quarter wave plate 1216 and mirror 1212 do not extend as far as location 1246, so the light exits device 1234 through output port 1248.

In some embodiments of the invention, output port 1248 is located at location 1240 instead of at location 1246, so light exiting through output port 1248 is not laterally displaced at all, only light exiting through output port 1232 is laterally displaced. In some embodiments of the invention, output port 1248 is located on surface 1208, rather than on surface 1206, and the light exits device 1234 going in the opposite direction to the input beam, as well as laterally displaced, for this polarization state of the input beam.

In some embodiments of the invention, there is a controllable polarization rotator 1239, through which input beam 1202 passes before reaching device 1234, which controls the polarization of input beam 1202, and hence controls in which direction the light beam is displaced, and whether it leaves device 1234 through output port 1232 or output port 1248.

It some embodiments of the invention, a configuration similar to that shown in FIG. 12B is used for one of the chromatic dispersion compensation devices and/or polarization mode dispersion compensation devices shown in FIGS. 5, 6C, 7 and 8. In these embodiments of the invention, the block of birefringent material extends both above and below the input port, as in FIG. 12B. There is a controllable polarization rotator, located for example on the path of beams 402 and 404 shown in FIG. 4, after they leave beam splitter 306 but before they enter the dispersion compensation device, which controls the polarization of light entering the device, and hence controls whether the light is laterally displaced upward or downward in the device. Optionally, the portions of the dispersion compensation device above and below the input port have different effects on the chromatic and/or polarization mode dispersion of the light. Optionally, light exiting the device through at least one output port passes through another polarization controller, which restores the light to its original polarization.

In some embodiments of the invention, two or more of the modules or devices described, which use blocks of birefringent material and quarter wave plates, are arranged along a single long block of birefringent material, with one device arranged after the other device. At the end of the first device, the light immediately continues to propagate in the second device, without any need for the light to leave the first device through an output port and to enter the second device through an input port, and so on for any other devices arranged on the same block.

The invention has been described, in some cases, in the context of the best mode for carrying it out. It should be understood that not all features shown in the drawing or described in the associated text may be present in an actual device, in accordance with some embodiments of the invention. Furthermore, variations on the method and apparatus shown are included within the scope of the invention, which is limited only by the claims. Also, features of one embodiment may be provided in conjunction with features of a different embodiment of the invention. As used herein, the terms "have", "include" and "comprise" or their conjugates mean "including but not limited to."

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of changing the dispersion of a light beam, the method comprising:
   a) providing at least a first and second dispersion compensating elements each comprising a GT etalon cavity having a highly reflective surface and a partially reflective surface separated from said highly reflective surface by a transparent material, the GT etalon cavities of said at least first and second dispersion compensating elements are characterized respectively by at least first and second group delay frequency profiles;
   b) causing the light beam to pass through each of said at least first and second dispersion compensating element, and to leave the respective dispersion compensating element;
   c) directing the light beam to interact with one or more of said at least first and second dispersion compensating elements at least one additional time thereby causing multiple interactions of the light beam with the dispersion compensating elements and increasing the effect of the dispersion compensation;
   wherein said at least first and second group delay profiles of said GT etalon cavities are selected such that within a central frequency of one or more frequency channels the second frequency derivatives of said at least first and second group delay profiles add substantially to zero providing for group delay ripples of the order of third frequency derivatives of said at least first and second group delay profiles.

2. The method according to claim 1, comprising passing the light beam through a block of birefringent material from a first entry location to a first exit location along a first path, applying polarization rotation to said light beam after emerging from said block, and causing said light beam to pass through said first dispersion compensating element.

3. The method according to claim 2, comprising applying to the light beam, on its way towards and away from the at least first and second dispersion compensating elements, the passage through the block of birefringent material and polarization rotation.

4. The method according to claim 2, wherein directing the light beam to interact with a dispersion compensating element at least one additional time comprises:
   a) changing a polarization state of the light beam;
   b) directing the light beam to pass back through the block from the previous exit location to an opposite location, following another path oriented at a different angle due to its changed polarization state;
   c) changing the light beam substantially back to its previous polarization state; and
   d) directing the light beam to pass back through the block from said opposite location to a next exit location, following still another path oriented at a different angle due to its changed polarization state;
   the light entering a different portion of the dispersion compensating element, laterally displaced from said previous exit location.

5. A dispersion compensation device comprising:
   a) an input module which receives a light beam;
   b) a dispersion compensating module to which the input module directs light from the light beam, comprising:
   i) at least first and second dispersion compensating elements arranged for multiple interaction with said light from the input module, each of said at least first and second dispersion compensating elements comprising a GT etalon cavity having a highly reflective surface and a partially reflective surface separated from said highly reflective surface by a transparent material, the GT etalon cavities of said at least first and second dispersion compensating elements are characterized respectively by at least first and second group delay frequency profiles corresponding to the dispersion of light interacting with the respective dispersion compensating element; and ii) a directing element which directs the light to interact with at least said first dispersion compensating element at least one additional time, said directing element comprising at least one of a mirror and said second dispersion compensating element;

wherein said at least first and second group delay profiles of the GT etalon cavities are selected such that within a central frequency of one or more frequency channels the second frequency derivatives of said at least first and second group delay profiles add substantially to zero providing for group delay ripples of the order of the third frequency derivatives of said at least first and second group delays profiles.

6. The device according to claim 5, wherein the dispersion compensating module comprises:

a) a block of birefringent material through which the light passes between interactions with said first and second dispersion compensating elements; -said first dispersion compensating element, located at a first side of the block and appropriately extending laterally at said first side, the directing element, located at a second side of the block and appropriately extending laterally at said second side, and said second dispersion compensating element is located either at said first side of the block or at said second side of the block implementing said directing element; and b) a polarization changing element situated between the second side of the block and the directing element, which changes the polarization of the light directed back to the first dispersion compensating element, causing the light to follow a different path in the birefringent block, and to return to the first side of the block at a location laterally displaced along said first side from a location where the light previously left said first side.

7. The device according to claim 5, wherein said first and second dispersion compensating elements are arranged so that the light interacts with the GT etalon cavity of said second dispersion compensating element after interacting with the first GT etalon cavity of said first dispersion compensating element.

8. The dispersion compensation device according to claim 5, comprising a control module which controls the degree of dispersion compensation, by controlling the temperature of at least one of the GT etalon cavities.

9. The dispersion compensation device according to claim 5, including a control module which controls at least two parameters of the dispersion compensating module.

10. The device according to claim 5, wherein the input module is configured to convert an unpolarized light beam entering it into two parallel polarized light beams which enter the dispersion compensation module, the dispersion compensating module being configured to change the dispersion of each of the two parallel light beams by a different amount, thereby providing polarization mode dispersion compensation to the output beam.

11. The device according to claim 5, wherein the input module is configured to convert an unpolarized light beam entering it into two parallel polarized light beams which enter the dispersion compensation module, the dispersion compensating module being configured to change the group delay of each of the two parallel light beams by a different amount, thereby providing polarization mode dispersion compensation to the output beam.

12. An optical network comprising a dispersion compensation device according to claim 5, wherein at least one parameter of the dispersion compensating module is chosen to maximize one or more of Q-factor and eye-opening, or minimize bit error rate of the network, or both.

13. The device according to claim 5, including a control module to control the degree of dispersion compensation provided by the dispersion compensating module, in real time.

14. The device according to claim 5, wherein the dispersion compensation module comprises a movable minor which covers at least one of the dispersion compensating elements to an adjustable extent, the covering portion blocking the light from interacting with the dispersion compensating element, thereby controlling the degree of dispersion compensation.

15. An optical network comprising a dispersion compensation device according to claim 13, wherein the control module is configured to use a feedback loop to control one or more of Q-factor, eye-opening, and bit error rate in the network, by controlling the degree of dispersion compensation provided by the dispersion compensation device.

16. An optical network comprising a dispersion compensation device according to claim 13, wherein the control module monitors the wavelength of light in the network, and controls the degree of dispersion compensation depending on the wavelength.

* * * * *